United States Patent
Yamada et al.

(10) Patent No.: US 11,002,686 B2
(45) Date of Patent: May 11, 2021

(54) CORRUGATED BOARD SHEET DEFECT DETECTING DEVICE, CORRUGATED BOARD SHEET DEFECT REMOVING DEVICE AND CORRUGATED BOARD SHEET MANUFACTURING DEVICE

(71) Applicant: MITSUBISHI HEAVY INDUSTRIES MACHINERY SYSTEMS, LTD., Hyogo (JP)

(72) Inventors: Masahiro Yamada, Tokyo (JP); Takashi Toyohara, Tokyo (JP); Hiroshi Ishibuchi, Tokyo (JP); Hideki Mizutani, Hiroshima (JP); Akira Ogino, Hiroshima (JP); Shuichi Takemoto, Hiroshima (JP); Naoyuki Fukushige, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/070,985

(22) PCT Filed: Dec. 28, 2016

(86) PCT No.: PCT/JP2016/089080
§ 371 (c)(1),
(2) Date: Jul. 18, 2018

(87) PCT Pub. No.: WO2017/130631
PCT Pub. Date: Aug. 3, 2017

(65) Prior Publication Data
US 2019/0025227 A1    Jan. 24, 2019

(30) Foreign Application Priority Data

Jan. 29, 2016 (JP) ............................. JP2016-015636

(51) Int. Cl.
*G01N 21/89* (2006.01)
*B31F 1/28* (2006.01)
(Continued)

(52) U.S. Cl.
CPC .............. *G01N 21/89* (2013.01); *B31F 1/28* (2013.01); *B31F 1/2831* (2013.01);
(Continued)

(58) Field of Classification Search
CPC .......... B31F 1/2831; B31F 1/28; G01B 11/24; G01N 21/89; G01N 21/892; G01N 2021/8887; G01N 2021/8917
(Continued)

(56) References Cited

U.S. PATENT DOCUMENTS 3,630,806 A * 12/1971 Kitajima ............... B29C 43/305
156/472
4,369,905 A * 1/1983 Tokuno ................. B31F 1/2836
226/17
(Continued)

FOREIGN PATENT DOCUMENTS

| EP | 2101142 A1 | 9/2009 |
| JP | 562279931 A | 12/1987 |
| JP | 4857382 B2 | 1/2012 |

OTHER PUBLICATIONS

Extended European Search Report for European Application No. 16 88 8215 dated Dec. 3, 2018; 7pp.
(Continued)

*Primary Examiner* — George R Koch
(74) *Attorney, Agent, or Firm* — Hauptman Ham, LLP

(57) ABSTRACT

A corrugated board sheet defect detecting device detects a defect in a single-faced cardboard sheet guided by a guide member with corrugated core paper facing outwards. The
(Continued)

device includes a radiating device, an image capturing device, an image processing device, and an assessing device. The radiating device is configured to radiate light toward the core paper at a radiation angle relative to the single-faced cardboard sheet. The image capturing device is configured to capture an image of a portion of the core paper irradiated with the light. The image processing device is configured to a light portion and a dark portion in a direction in which the single-faced cardboard sheet is transported based on the captured image. The assessing device is configured to assess a quality by comparing a length of the light portion and a length of the dark portion.

20 Claims, 17 Drawing Sheets

(51) Int. Cl.
G01N 21/892 (2006.01)
G01N 21/88 (2006.01)
(52) U.S. Cl.
CPC ... *G01N 21/892* (2013.01); *G01N 2021/8887* (2013.01); *G01N 2021/8917* (2013.01)
(58) Field of Classification Search
USPC .................................. 356/237.2, 239.7, 638
See application file for complete search history.

(56) References Cited

U.S. PATENT DOCUMENTS

| | | | | |
|---|---|---|---|---|
| 4,737,846 A | * | 4/1988 | Tokuno | B31F 1/2831 348/128 |
| 5,351,308 A | * | 9/1994 | Kaminer | G01B 11/303 250/559.08 |
| 2006/0225830 A1 | * | 10/2006 | Kohler | B31F 1/2836 156/210 |
| 2006/0278342 A1 | * | 12/2006 | Baierl | B31F 1/2818 156/378 |
| 2008/0317940 A1 | * | 12/2008 | Kohler | B31F 1/2818 427/8 |
| 2009/0091761 A1 | * | 4/2009 | Kraus | B31F 1/2831 356/429 |
| 2010/0195115 A1 | * | 8/2010 | Mouri | B31F 1/2831 356/601 |
| 2018/0099471 A1 | * | 4/2018 | Baierl | B31F 1/2818 |
| 2020/0118262 A1 | * | 4/2020 | Takemoto | G01B 11/02 |

OTHER PUBLICATIONS

ISR and WO of International Application No. PCT/JP2016/089080, dated Mar. 28, 2017; 9 pp.
Korean Office Action for Application No. 10-2018-7020692 dated Sep. 25, 2019; 11pp.

* cited by examiner

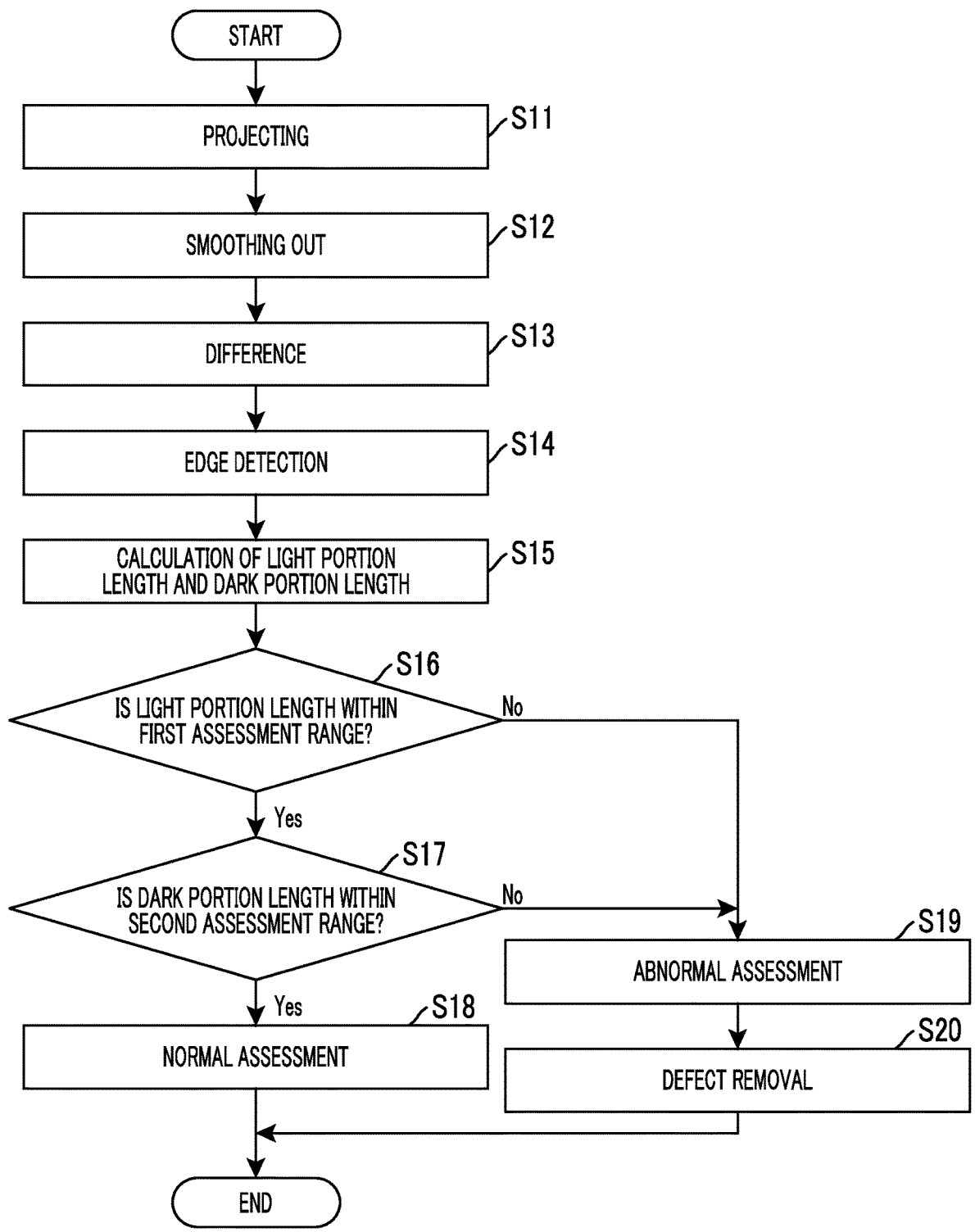

CRUSHED FLUTE

LOWER FLUTE

HIGHER FLUTE 1

HIGHER FLUTE 2

CORRUGATED BOARD SHEET DEFECT DETECTING DEVICE, CORRUGATED BOARD SHEET DEFECT REMOVING DEVICE AND CORRUGATED BOARD SHEET MANUFACTURING DEVICE

RELATED APPLICATIONS

The present application is a National Phase of International Application Number PCT/JP2016/089080 filed Dec. 28, 2016, and claims priority based on Japanese Patent Application Number 2016-015636 filed Jan. 29, 2016.

TECHNICAL FIELD

The present invention relates to a corrugated board sheet defect detecting device that detects a defect in a corrugated fiberboard obtained by pasting a bottom liner to corrugated core paper and a top liner, a corrugated board sheet defect removing device that includes the corrugated board sheet defect detecting device, and a corrugated board sheet manufacturing device that includes the corrugated board sheet defect removing device.

BACKGROUND ART

A corrugating machine, which is a corrugated board sheet manufacturing device, includes a single facer that forms a single-faced cardboard sheet and a double facer that pastes bottom liner paper to the single-faced cardboard sheet to form a double-faced cardboard sheet. The single facer processes core paper (medium) into a wave shape and pastes a top liner to form a single-faced cardboard sheet, and the double facer pastes a bottom liner to the single-faced cardboard sheet to form a double-faced cardboard sheet. The continuous double-faced cardboard sheet manufactured by the double facer is cut by a slitter scorer so as to have a predetermined width, and is cut by a cutoff device so as to have a predetermined length, thereby becoming a corrugated fiberboard.

In the corrugating machine, when pasting corrugated core paper to a top liner to form a single-faced cardboard sheet, corrugated flutes of the core paper deform in some cases. If the core paper deforms, an adhering defect occurs when pasting a bottom liner to the single-faced cardboard sheet, or the thickness of a double-faced cardboard sheet becomes uneven in some cases, thereby causing the generation of a defective corrugated fiberboard.

Therefore, for example, a corrugated board sheet defect detecting device that detects the deformation of core paper of a single-faced cardboard sheet is proposed in the following patent literature. A single-faced cardboard defect detecting device disclosed in PTL 1 radiates light onto medium paper to create a striped shadow, captures an image of the shadow in a regular cycle, and assesses a defect based on the number of the stripes.

CITATION LIST

Patent Literature

[PTL 1] Japanese Unexamined Patent Application Publication No. 62-279931

SUMMARY OF INVENTION

Technical Problem

The single-faced cardboard defect detecting device of PTL 1 described above assesses a defect based on the number of striped shadows generated by radiating light to medium paper. However, if corrugated flutes of the core paper of a single-faced cardboard sheet deform significantly, the shadows of adjacent corrugated flutes of the core paper overlap each other. As a consequence, the number of striped shadows reduces and this can be detected as a defect. However, in a case where the corrugated flutes of the core paper have deformed slightly, the shadows of adjacent corrugated flutes of the core paper do not overlap each other. As a consequence, the number of striped shadows does not reduce and this cannot be assessed as a defect even when the single-faced cardboard sheet is defective.

The invention is devised in order to solve the problems described above, and an object thereof is to provide a corrugated board sheet defect detecting device, a corrugated board sheet defect removing device, and a corrugated board sheet manufacturing device, which can detect a defect in a corrugated fiberboard caused by the deformation of a corrugated flute of core paper with high accuracy.

Solution to Problem

According to the invention for solving the object descried above, there is provided a corrugated board sheet defect detecting device that detects a defect in a single-faced cardboard sheet guided by a guide member with corrugated core paper facing outwards. The corrugated board sheet defect detecting device includes a radiating device that radiates light toward the core paper at a radiation angle which is inclined through a predetermined angle set in advance relative to the single-faced cardboard sheet, an image capturing device that captures an image of a portion of the core paper, the portion being radiated with the light, an image processing device that defines a light portion and a dark portion in a direction in which the single-faced cardboard sheet is transported on the basis of the image captured by the image capturing device, and an assessing device that assesses a quality by comparing a length of the light portion and a length of the dark portion defined by the image processing device with assessment values set in advance.

Accordingly, when the radiating device radiates light toward the core paper of the single-faced cardboard sheet guided by the guide member, the image capturing device captures an image of a portion of the core paper radiated with the light, the image processing device defines the light portion and the dark portion in the transporting direction of the single-faced cardboard sheet on the basis of the captured image, and the assessing device assesses the quality of the single-faced cardboard sheet by comparing the length of the light portion and the length of the dark portion with the assessment values. At this time, a defect in the core paper, that is, a defect in the corrugated fiberboard is detected on the basis of the lengths of the light portion and the dark portion which are formed by shadows of flutes of the corrugated core paper. For this reason, a crushing defect, a height defect, and a length defect of a flute of the core paper can be detected, and a defect in the corrugated fiberboard caused by the deformation of corrugated flutes of the core paper can be detected with high accuracy.

In the corrugated board sheet defect detecting device of the invention, the radiating device radiates parallel light toward the core paper.

Accordingly, by the radiating device radiating parallel light toward the core paper, a boundary line between the light portion and the dark portion is clearly formed, and the length of the light portion and the length of the dark portion can be defined with high accuracy.

In the corrugated board sheet defect detecting device of the invention, the guide member has a curved surface.

Accordingly, since the guide member has the curved surface, the single-faced cardboard sheet is likely to go along the guide member, the vibration of the single-faced cardboard sheet is suppressed, and thus the single-faced cardboard sheet can be stably guided.

In the corrugated board sheet defect detecting device of the invention, the guide member is a guide roller.

Accordingly, the single-faced cardboard sheet is guided by the guide roller while staying in contact with the guide roller since the guide roller is set as the guide member. As the guide roller rotates, the single-faced cardboard sheet can be smoothly guided while the vibration of the single-faced cardboard sheet is being suppressed.

In the corrugated board sheet defect detecting device of the invention, the guide member is a columnar body or a cylindrical body.

Accordingly, since the columnar body or the cylindrical body is set as the guide member, the single-faced cardboard sheet is guided by the columnar body or the cylindrical body and the vibration of the single-faced cardboard sheet can be suppressed.

In the corrugated board sheet defect detecting device of the invention, the guide member is a plate-shaped body.

Accordingly, since the plate-shaped body is set as the guide member, the single-faced cardboard sheet is guided by the plate-shaped body and the vibration of the single-faced cardboard sheet can be suppressed.

In the corrugated board sheet defect detecting device of the invention, the guide member is provided with a suction unit on a guiding surface thereof that guides the single-faced cardboard sheet.

Accordingly, when the corrugated fiberboard is guided by the guiding surface of the guide member, the corrugated fiberboard is sucked by the suction unit and the single-faced cardboard sheet can be reliably brought into contact with the guide member.

In the corrugated board sheet defect detecting device of the invention, the assessing device assesses the quality by comparing the length of the light portion with a first assessment value and assesses the quality by comparing the length of the dark portion with a second assessment value.

Accordingly, an undetected defect in the core paper reduces, and thus a defect detection accuracy can be improved by assessing the quality of the core paper based on the abnormality of the length of the light portion and the abnormality of the length of the dark portion.

In the corrugated board sheet defect detecting device of the invention, the first assessment value and the second assessment value are a value calculated by averaging out lengths of a plurality of the light portions, on which quality assessment is already completed, and a value calculated by averaging out lengths of a plurality of the dark portions, on which quality assessment is already completed, respectively.

Accordingly, even in a case where the shape of a flute of the core paper has changed due to operating conditions, this is not assessed as a defect and the occurrence of false detection of a defect can be suppressed by setting the assessment values to a value obtained by averaging out the lengths of the plurality of light portions, on which quality assessment is completed, and a value obtained by averaging out the lengths of the plurality of dark portions, on which quality assessment is completed, respectively, that is so-called, moving average values.

In the corrugated board sheet defect detecting device of the invention, the first assessment value and the second assessment value are set as a first assessment range and a second assessment range which are obtained by adding predetermined margins to prescribed reference values of the lengths of the light portion and the dark portion.

Accordingly, after the quality of the corrugated fiberboard is ensured by setting the first assessment range and the second assessment range obtained by adding the margins to the reference values of the lengths of the light portion and the dark portion as the assessment values, the occurrence of false detection of a defect can be suppressed by assessing the quality in consideration of variations in the shapes of flutes of the core paper of the single-faced cardboard sheet occurred when manufacturing.

In the corrugated board sheet defect detecting device of the invention, the first assessment value and the second assessment value are set for each type of the single-faced cardboard sheet, and are stored in a memory device.

Accordingly, even when the type of the single-faced cardboard sheet is changed, a high-precision quality assessment is possible and a quality assessment accuracy can be improved by changing each assessment value according to the heights or widths of flutes of the core paper.

In the corrugated board sheet defect detecting device of the invention, the assessing device assesses the quality by comparing a ratio between the length of the light portion and the length of the dark portion with an assessment value.

Accordingly, since the quality of the core paper is assessed based on a ratio between the length of the light portion and the length of the dark portion, a ratio between the length of the light portion and the length of the dark portion is almost the same even when various types of devices vibrate. Therefore, even when a normal shadow image is not obtained, false detection is suppressed, and thus a defect detection accuracy can be improved.

In the corrugated board sheet defect detecting device of the invention, the assessing device assesses the quality by comparing an average value of ratios between lengths of a plurality of the light portions and lengths of a plurality of the dark portions with the assessment value.

Accordingly, since the assessing device assesses the quality by comparing an average value of ratios between the lengths of the plurality of light portions and the lengths of the plurality of dark portions with the assessment value, a ratio between the length of the light portion and the length of the dark portion is almost the same even when various types of devices vibrate. In addition, even in a case where the shapes of flutes of the core paper have changed due to operating conditions, this is not assessed as a defect. Even when a normal shadow image is not obtained, false detection is suppressed, and thus a defect detection accuracy can be improved.

In the corrugated board sheet defect detecting device of the invention, the assessment value is a ratio between a total value of the lengths of the plurality of the light portions, on which quality assessment is already completed, and a total value of the lengths of the plurality of the dark portions, on which quality assessment is already completed.

Accordingly, since a ratio between a total value of ratios between the lengths of the plurality of light portions and the lengths of the plurality of dark portions is set as the assessment value, a ratio between the length of the light portion and the length of the dark portion is almost the same even when various types of devices vibrate. Therefore, even when a normal shadow image is not obtained, false detection is suppressed, and thus a defect detection accuracy can be improved.

In the corrugated board sheet defect detecting device of the invention, the assessment value is a ratio between an average value of the lengths of the plurality of the light portions, on which quality assessment is already completed, and an average value of the lengths of the plurality of the dark portions, on which quality assessment is already completed.

Accordingly, a defect detection accuracy can be further improved by using a ratio between average values calculated with the number of the lengths of the light portions and the number of the lengths of the dark portions increased.

In the corrugated board sheet defect detecting device of the invention, the assessing device assesses the quality by comparing a light portion average value, which is calculated by averaging out lengths of a plurality of the light portions, with a first assessment value and assesses the quality by comparing a dark portion average value, which is calculated by averaging out lengths of a plurality of the dark portions, with a second assessment value.

Accordingly, even in a case where the shape of a flute of the core paper has changed due to operating conditions, this is not assessed as a defect since the quality is assessed based on the light portion average value and the dark portion average value, that is, so-called moving average values. Thus, the occurrence of false detection of a defect is suppressed and a defect detection accuracy can be improved.

In the corrugated board sheet defect detecting device of the invention, the radiation angle of the radiating device is an angle relative to a perpendicular line, which is perpendicular to the single-faced cardboard sheet and passes through a flute top portion of the core paper, and is set to an angle larger than an angle between the perpendicular line and an inclined line along an inclined surface of a flute of the core paper.

Accordingly, the shadow of the flute of the core paper can be clearly formed by parallel light by setting the radiation angle of the radiating device to an angle larger than an angle between the perpendicular line and the inclined line along the inclined surface of the flute of the core paper.

In the corrugated board sheet defect detecting device of the invention, a radiation angle changing device that changes the radiation angle of the radiating device is further included.

Accordingly, even when the type of the single-faced cardboard sheet has changed, the shadow of a flute of the core paper can be clearly formed by parallel light by the radiation angle changing device changing the radiation angle of the radiating device according to each shape of a flute of the core paper since the shape of a flute of the core paper is different for each type of the single-faced cardboard sheet.

In the corrugated board sheet defect detecting device of the invention, the image capturing device is a line camera.

Accordingly, even in a case where a distance between the line camera and the single-faced cardboard sheet changes according to a position in the transporting direction, an image can be captured without out of focus by setting the line camera as the image capturing device.

In the corrugated board sheet defect detecting device of the invention, the image capturing device is configured such that a plurality of the line cameras are disposed in a width direction of the single-faced cardboard sheet.

Accordingly, a distance between each line camera and the single-faced cardboard sheet can be shortened, and positions for disposing the line cameras can be easily secured by disposing the plurality of line cameras in the width direction of the single-faced cardboard sheet, and an image capturing accuracy can be improved by making resolution higher.

In the corrugated board sheet defect detecting device of the invention, the line camera captures an image of the radiated portion of a flute of the core paper, and the image processing device defines the plurality of the consecutive light portions and the dark portions in a direction in which the single-faced cardboard sheet is transported by combining a plurality of the images of flutes of the core paper captured by the line camera.

Accordingly, by combining a plurality of images of flutes of the core paper, which are captured by the line camera, to make a single image, the quality of the plurality of flutes of the core paper can be comprehensively assessed, and the number of processing steps of the assessing device can be reduced.

In the corrugated board sheet defect detecting device of the invention, the image processing device defines the light portion and the dark portion by adding up image capturing data pieces in a predetermined pixel unit in a width direction of the single-faced cardboard sheet on the basis of the images captured by the image capturing device.

Accordingly, the light portion and the dark portion can be clearly displayed by adding up the image capturing data pieces in a predetermined pixel unit in the width direction of the single-faced cardboard sheet and removing noise.

In the corrugated board sheet defect detecting device of the invention, the image processing device defines the light portion and the dark portion by adding up a part of image capturing data pieces in a width direction of the single-faced cardboard sheet on the basis of the images captured by the image capturing device.

Accordingly, by adding up a part of image capturing data pieces in a predetermined pixel unit in the width direction of the single-faced cardboard sheet and removing noise, the number of processing steps of the image processing device reduces, and thus processing time can be shortened.

In the corrugated board sheet defect detecting device of the invention, the image capturing device is set to have an image capturing interval according to a transporting speed of the single-faced cardboard sheet or a pitch of flutes of the core paper.

Accordingly, by setting an image capturing interval according to the transporting speed of the single-faced cardboard sheet or the pitch of flutes of the core paper since the shape of a flute of the core paper is different for each type of the single-faced cardboard sheet, an optimal image capturing interval according to the shape of the flute of the core paper is set, and thus an image of the shadow of the flute of the core paper formed by parallel light can be clearly captured.

In the corrugated board sheet defect detecting device of the invention, a display device that displays assessment results from the assessing device is further included.

Accordingly, quality assessment results of the single-faced cardboard sheet are displayed onto the display device, and an operator can check the status of occurrence of a defect at an early stage.

In the corrugated board sheet defect detecting device of the invention, a vibration detection device that detects vibration of at least one of the radiating device and the image capturing device and an alarm device that issues an alarm are further included, and if a detection value from the vibration detection device exceeds prescribed a vibration reference value, the assessing device operates the alarm device.

Accordingly, if the radiating device or the image capturing device vibrates, there is a possibility that an appropriate image of a flute of the core paper cannot be obtained. If the detection value of vibration exceeds the vibration reference value, an alarm is issued. Thus, an operator can recheck firsthand the quality assessment of the corrugated fiberboard, which is being assessed when the vibration occurs, and thus a quality assessment accuracy can be improved.

According to the invention, there is provided a corrugated board sheet defect removing device including the corrugated board sheet defect detecting device and an outputting device that outputs a double-faced cardboard sheet, which is cut out to a predetermined length including a defective point detected by the corrugated board sheet defect detecting device.

Accordingly, the corrugated board sheet defect detecting device detects a defect in the core paper, that is, a defect in the corrugated fiberboard on the basis of the length of the light portion and the length of the dark portion, which are formed by the shadow of a flute of the corrugated core paper, and the outputting device outputs and removes the double-faced cardboard sheet, which is cut out to a predetermined length including the defective point, from the transport line. For this reason, a crushing defect, a height defect, and a length defect of a flute of the core paper can be detected, a defect in the corrugated fiberboard caused by the deformation of corrugated flutes of the core paper can be detected with high accuracy, and only the non-defective corrugated fiberboard can be transported.

In the corrugated board sheet defect removing device of the invention, a defect position identifying device that identifies a defect position detected by the corrugated board sheet defect detecting device, a tracking device that tracks the defect position identified by the defect position identifying device, and a control device that operates the outputting device on the basis of tracking results from the tracking device are further included.

Accordingly, if a defect in the corrugated fiberboard is detected, the defect position identifying device identifies a defect position on the single-faced cardboard sheet, and the tracking device tracks the defect position to operate the outputting device. Therefore, the defective corrugated fiberboard can be reliably output and removed from the transport line.

In the corrugated board sheet defect removing device of the invention, the defect position identifying device identifies the defect position based on a distance by which the single-faced cardboard sheet is transported from a time when the image capturing device captures an image to a time when the assessing device assesses a defect, the tracking device estimates a time when the defect position reaches the outputting device, and the control device operates the outputting device at the time when the defect position reaches the outputting device.

Accordingly, a defect position is identified based on a distance by which the corrugated fiberboard is transported from a time when an image is captured to a time when a defect is assessed, a time when the defect position reaches the outputting device is estimated, and the outputting device is operated at a time when the defect position reaches the outputting device. Thus, a defective corrugated fiberboard can be reliably output and removed from the transport line.

According to the invention, there is provided a corrugated board sheet manufacturing device including a single facer that pastes a second liner to corrugated core paper to manufacture a single-faced cardboard sheet, a double facer that pastes a first liner to the core paper side of the single-faced cardboard sheet to manufacture a double-faced cardboard sheet, and the corrugated board sheet defect removing device.

Accordingly, the single facer manufactures the single-faced cardboard sheet by pasting the second liner to the corrugated core paper, and the double facer manufactures the double-faced cardboard sheet by pasting the first liner to the core paper side of the single-faced cardboard sheet manufactured by the single facer. At this time, the defect removing device detects a defect in the corrugated fiberboard, and the outputting device outputs and removes the double-faced cardboard sheet, which is cut out to a predetermined length including a defective point, from the transport line. For this reason, a crushing defect, a height defect, and a length defect of a flute of the core paper can be detected, a defect in the corrugated fiberboard caused by the deformation of corrugated flutes of the core paper can be detected with high accuracy, and only the non-defective corrugated fiberboard can be transported.

Advantageous Effects of Invention

In the corrugated board sheet defect detecting device, the corrugated board sheet defect removing device, and the corrugated board sheet manufacturing device of the invention, a defect in the corrugated fiberboard caused by the deformation of corrugated flutes of the core paper can be detected with high accuracy since the image processing device that defines the light portion and the dark portion in the transporting direction of the single-faced cardboard sheet on the basis of a captured image is provided and the assessing device that assesses the quality by comparing the length of the defined light portion and the length of the defined dark portion with the assessment values is provided.

BRIEF DESCRIPTION OF DRAWINGS

FIG. 7 is a flow chart for illustrating an image processing method.

DESCRIPTION OF EMBODIMENTS

Hereinafter, suitable embodiments of a corrugated board sheet defect detecting device, a corrugated board sheet defect removing device, and a corrugated board sheet manufacturing device of the invention will be described in detail with reference to accompanying drawings. The invention is not limited to the embodiments. In a case where there are a plurality of embodiments, the invention may also include devices configured by combining the respective embodiments.

First Embodiment

Figure 1:
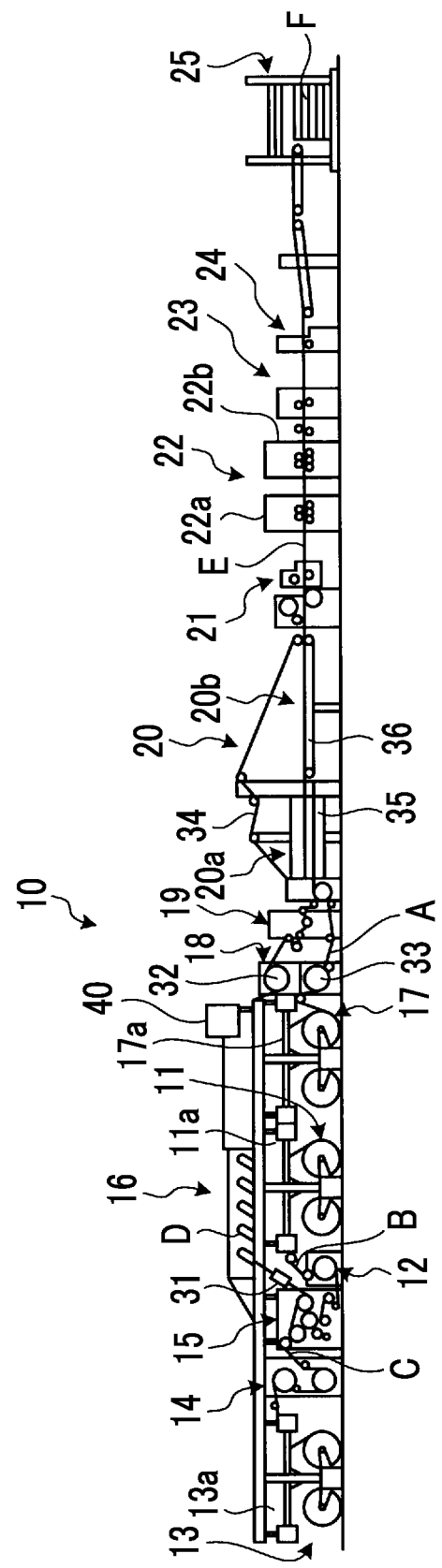
FIG. 1 is a schematic view illustrating a corrugating machine which is a corrugated board sheet manufacturing device of a first embodiment.

FIG. 1 is a schematic view illustrating a corrugating machine which is a corrugated board sheet manufacturing device of a first embodiment.

In the first embodiment, a corrugating machine 10, which is the corrugated board sheet manufacturing device, is an apparatus that manufactures a double-faced cardboard sheet by pasting, for example, a top liner C, which is a second liner, to a corrugated medium (core paper) B to manufacture a single-faced cardboard sheet D, pasting, for example, a bottom liner A, which is a first liner, to a medium B side of the manufactured single-faced cardboard sheet D to make a double-faced cardboard sheet E, and cutting a continuous double-faced cardboard sheet E into double-faced cardboard sheets F having a predetermined length, as illustrated in FIG. 1.

The corrugating machine 10 has a mill roll stand 11 of the medium B, a preheater (preheating device) 12, a mill roll stand 13 of the top liner C, a preheater (preheating device) 14, a single facer 15, a bridge 16, a mill roll stand 17 of the bottom liner A, a preheater (preheating device) 18, a glue machine 19, a double facer 20, a rotary shear 21, a slitter scorer 22, a cutoff 23, a defective sheet outputting device 24, and a stacker 25.

A roll of paper that is core paper wound in a roll shape, on which the medium B is to be formed, is mounted on each of both sides of the mill roll stand 11, and above the mill roll stand, a splicer (paper splicing device) 11a that performs paper splicing is provided. In a case where paper is fed from one roll of paper, the other roll of paper is mounted to prepare for paper splicing. When a small amount of base paper from one roll of paper remains, base paper from the other roll of paper is spliced by the splicer 11a. While the base paper is being supplied from the other roll of paper, one roll of paper is mounted to prepare for paper splicing. In this manner, the base paper is spliced in turn and is continuously reeled out from the mill roll stand 11 to a downstream side.

A roll of paper that is the top liner C wound in a roll shape is mounted on each of both sides of the mill roll stand 13, and above the mill roll stand, a splicer 13a that performs paper splicing is provided. In a case where paper is fed from one roll of paper, the other roll of paper is mounted to prepare for paper splicing. When a small amount of base paper from one roll of paper remains, base paper from the other roll of paper is spliced by the splicer 13a. While the base paper is being supplied from the other roll of paper, one roll of paper is mounted to prepare for paper splicing. In this manner, the base paper is spliced in turn and is continuously reeled out from the mill roll stand 13 to a downstream side.

The preheaters 12 and 14 preheat the medium B and the top liner C respectively. The preheaters 12 and 14 each have a heating roll into which steam is supplied. By winding the base paper (medium B and top liner C), which is continuously reeled out from the mill roll stands 11 and 13, around the heating rolls and transporting the base paper, the temperature of the base paper rises to a predetermined temperature.

After the medium B heated by the preheater 12 is processed into a wavy shape, the single facer 15 applies glue to a top portion of each flute and pastes the top liner C heated by the preheater 14 to the medium, thereby forming the single-faced cardboard sheet D. A pickup conveyor 31 is provided obliquely above the single facer 15 on a downstream side of a transporting direction. The pickup conveyor 31 is configured with a pair of endless belts, and has a function of transporting the single-faced cardboard sheet D formed by the single facer 15 to the bridge 16 with the single-faced cardboard sheet being sandwiched therebetween. The bridge 16 functions as a stay unit that causes the single-faced cardboard sheet D to stay temporarily in order to absorb a speed difference between the single facer 15 and the double facer 20.

A roll of paper that is the bottom liner A wound in a roll shape is mounted on each of both sides of the mill roll stand 17, and above the mill roll stand, a splicer 17a that performs paper splicing is provided. In a case where paper is fed from one roll of paper, the other roll of paper is mounted to prepare for paper splicing. When a small amount of base paper from one roll of paper remains, base paper from the other roll of paper is spliced by the splicer 17a. While the base paper is being supplied from the other roll of paper, one roll of paper is mounted to prepare for paper splicing. In this manner, the base paper is spliced in turn and is continuously reeled out from the mill roll stand 17 to the downstream side.

The preheater 18 has a heating roll for the single-faced cardboard sheet D (hereinafter, single-faced corrugated board heating roll) 32 and a heating roll for the bottom liner A (hereinafter, bottom liner heating roll) 33. The single-faced corrugated board heating roll 32 has a winding amount adjusting device, is heated to a predetermined temperature as steam is supplied thereto, and can preheat the single-faced cardboard sheet D by winding a top liner C side of the single-faced cardboard sheet D around a circumferential surface thereof. Similarly, the bottom liner heating roll 33 also has a winding amount adjusting device, is heated to a predetermined temperature as steam is supplied thereto, and can preheat the bottom liner A by winding the bottom liner A around a circumferential surface thereof.

The glue machine 19 has an adhesive equipment and a pressurizing device. The single-faced cardboard sheet D heated by the single-faced corrugated board heating roll 32 is guided into the glue machine 19 on the way, and glue is applied to each of top portions of flutes of the medium B when passing between a rider roll and an adhesive applicator roll.

The single-faced cardboard sheet D to which glue is applied by the glue machine 19 is transferred to the double facer 20 for the next step. In addition, the bottom liner A heated by the bottom liner heating roll 33 also passes through the glue machine 19 and is transferred to the double facer 20.

The double facer 20 is divided into a heating section 20a on an upstream side and a cooling section 20b on the downstream side along a traveling line of the single-faced cardboard sheet D and the bottom liner A. The single-faced cardboard sheet D to which glue is applied by the glue machine 19 is brought in between a pressurizing belt 34 and a hot plate 35 through the heating section 20a, and the bottom liner A is brought in between the pressurizing belt 34 and the hot plate 35 so as to overlap the medium B side of the single-faced cardboard sheet D. After being brought in between the pressurizing belt 34 and the hot plate 35, the single-faced cardboard sheet D and the bottom liner A are integrated in a state of overlapping each other and are transferred to the cooling section 20b. By being heated while being pressurized during this transfer, the single-faced cardboard sheet D and the bottom liner A are pasted to each other and thus become the continuous double-faced cardboard sheet E. The double-faced cardboard sheet E is cooled naturally at the cooling section 20b when transported while being sandwiched between the pressurizing belt 34 and a transport belt 36.

The double-faced cardboard sheet E manufactured by the double facer 20 is transferred to the rotary shear 21. The rotary shear 21 cuts the double-faced cardboard sheet E in a width direction so as to have a full width or a partial width in a case where pasting is stabilized at an early stage of operation. The slitter scorer 22 severs the wide double-faced cardboard sheet E in the transporting direction so as to have a predetermined width, and processes creasing line extending in the transporting direction. The slitter scorer 22 is configured with a first slitter scorer unit 22a and a second slitter scorer unit 22b, which are arranged in the transporting direction of the double-faced cardboard sheet E and have substantially the same structure. The first slitter scorer unit 22a and the second slitter scorer unit 22b each have a plurality of sets of an upper creasing line roll and a lower creasing line roll, which are disposed so as to be opposed to each other with the double-faced cardboard sheet E being sandwiched therebetween, in the width direction, and each have a plurality of sets of slitter knives, which are disposed below the double-faced cardboard sheet E, in the width direction.

The cutoff 23 cuts the double-faced cardboard sheet E, which is severed by the slitter scorer 22 in the transporting direction, in the width direction, to form the plate-shaped double-faced cardboard sheet F having a predetermined length. The defective sheet outputting device 24 outputs the double-faced cardboard sheet F assessed as a defective sheet by a defect detecting device to be described later from a transport line. The stacker 25 piles up the non-defective double-faced cardboard sheets F to output to the outside of the apparatus as a product.

Herein, a corrugated board sheet defect detecting device of the first embodiment will be described. A corrugated board sheet defect detecting device 40 of the first embodiment is provided between the bridge 16 and the preheater 18.

Figure 2:
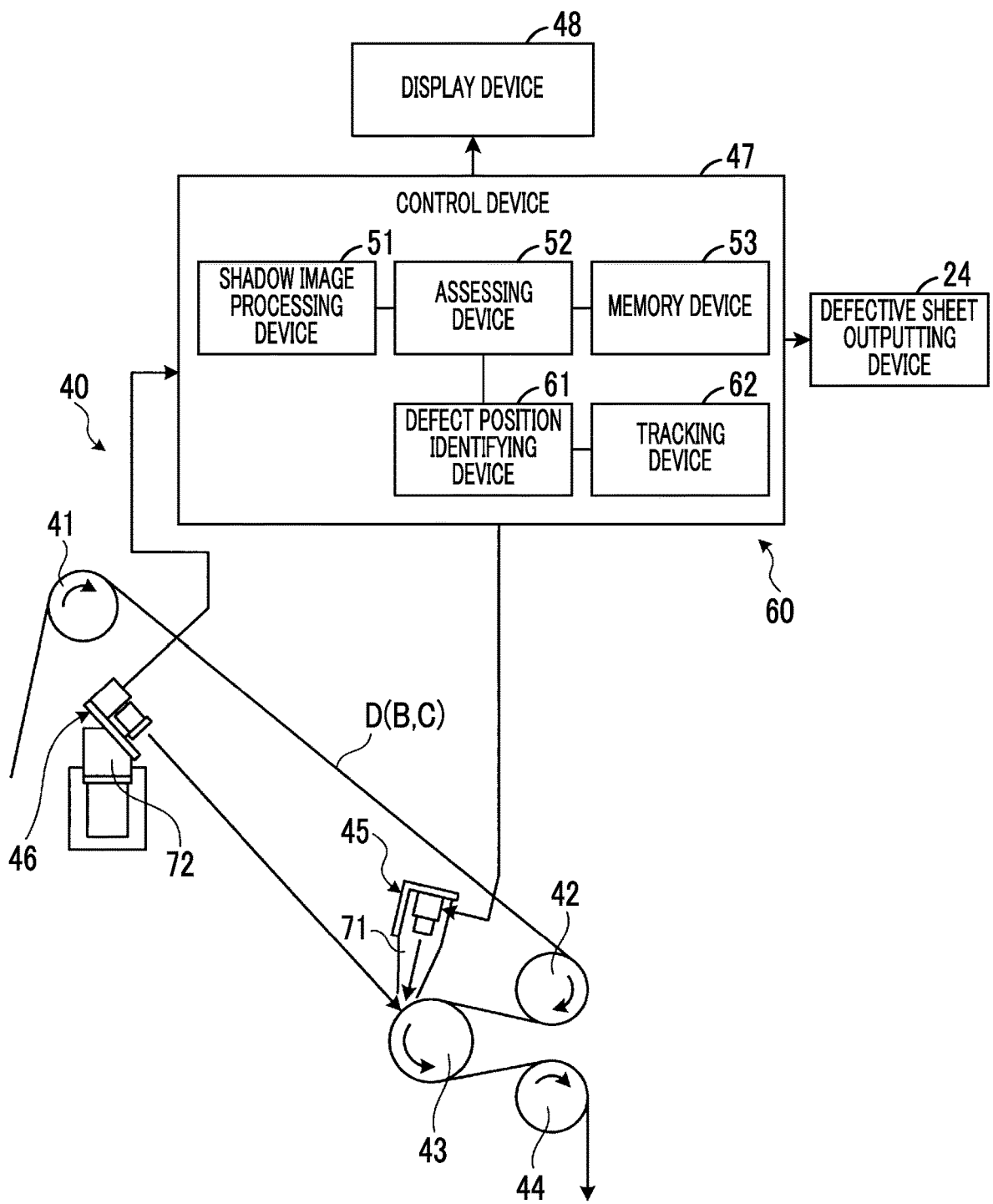
FIG. 2 is a schematic configuration view illustrating the corrugated board sheet defect detecting device of the first embodiment.
Figure 3:
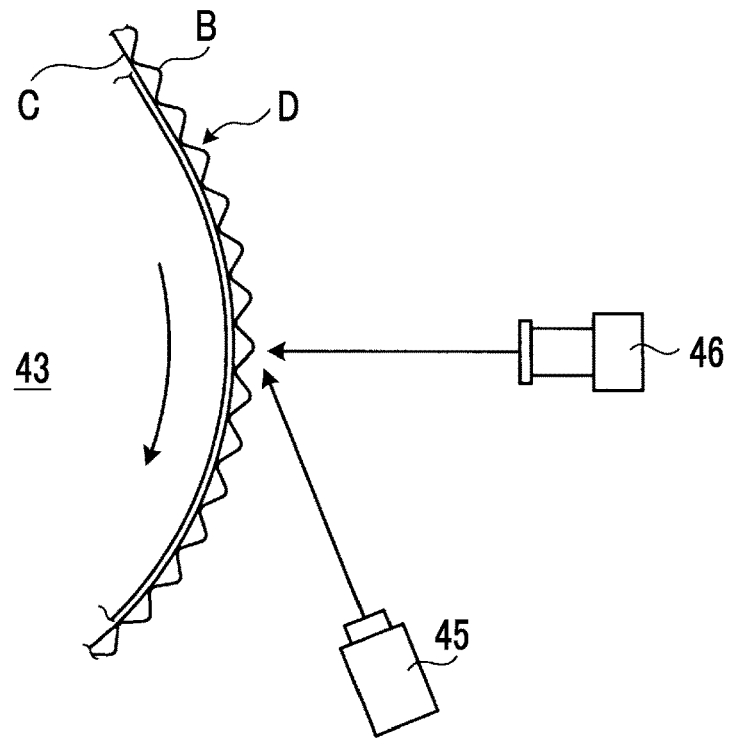
FIG. 3 is a side view illustrating a disposition configuration of a radiating device and an image capturing device with respect to a single-faced cardboard sheet.
Figure 4:
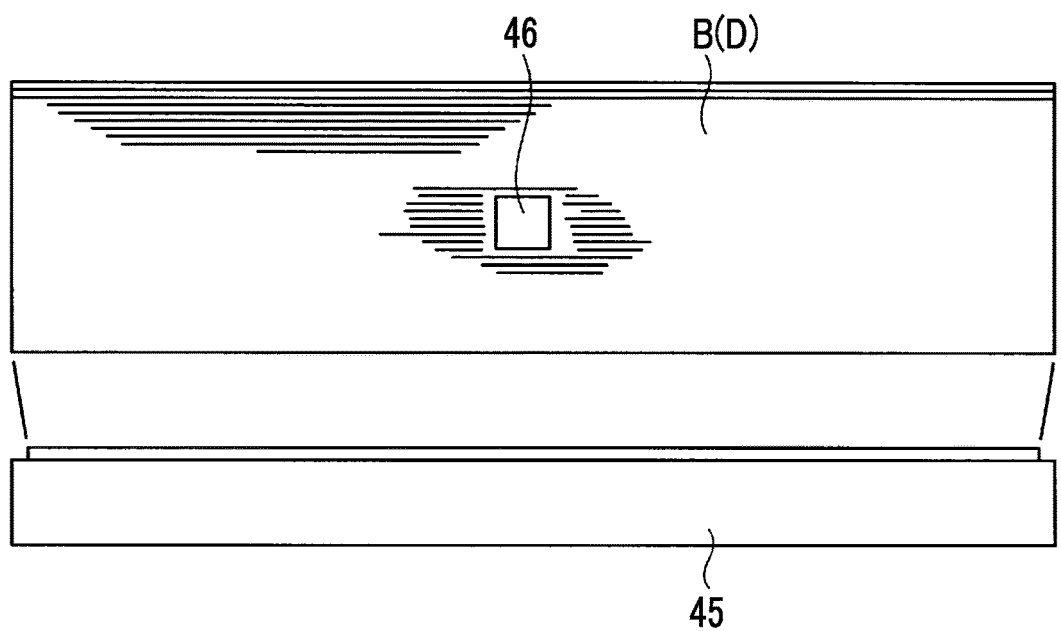
FIG. 4 is a front view illustrating the disposition configuration of the radiating device and the image capturing device with respect to the single-faced cardboard sheet.

FIG. 2 is a schematic configuration view illustrating the corrugated board sheet defect detecting device of the first embodiment, FIG. 3 is a side view illustrating a disposition configuration of a radiating device and an image capturing device with respect to the single-faced cardboard sheet, and FIG. 4 is a front view illustrating a disposition configuration of the radiating device and the image capturing device with respect to the single-faced cardboard sheet.

The corrugated board sheet defect detecting device 40 of the first embodiment detects a defect in the single-faced cardboard sheet D transported by the guide roller with the corrugated medium B facing outwards, as illustrated in FIG. 2. The corrugated board sheet defect detecting device 40 has guide rollers (guide members) 41, 42, 43, and 44, a radiating device 45, an image capturing device 46, a control device 47, and a display device 48. The control device 47 has a shadow image processing device 51, an assessing device 52, and a memory device 53. A corrugated board sheet defect removing device 60 has the corrugated board sheet defect detecting device 40 and a defective sheet outputting device 24. Specifically, the corrugated board sheet defect removing device 60 has a defect position identifying device 61 and a tracking device 62, which configure the control device 47.

Hereinafter, the corrugated board sheet defect detecting device 40 and the corrugated board sheet defect removing device 60 will be described in detail.

The guide rollers 41, 42, 43, and 44 can rotate to drive or can rotate to follow, and can guide and transport the single-faced cardboard sheet D with outer circumferential portions thereof. The single-faced cardboard sheet D is formed by the corrugated medium B being pasted to the top liner C, and the guide roller 43 guides the single-faced cardboard sheet D with the corrugated medium B facing outwards.

The radiating device 45 radiates parallel light toward the medium B at a radiation angle that is inclined through a predetermined prescribed angle relative to a perpendicular line perpendicular to the single-faced cardboard sheet D. The image capturing device 46 captures an image of a portion (shadow) of the medium B irradiated with the parallel light. The shadow image processing device 51 defines a light portion and a dark portion in a transporting direction in which the single-faced cardboard sheet D is transported on the basis of an image captured by the image capturing device 46. The assessing device 52 assesses the quality of the single-faced cardboard sheet D by comparing the length of the light portion and the length of the dark portion defined by the shadow image processing device 51 with prescribed assessment values. The memory device 53 stores assessment values used by the assessing device 52. The display device 48 displays assessment results from the assessing device 52.

The defect position identifying device 61 identifies a defect position on the single-faced cardboard sheet D, which is detected by the corrugated board sheet defect detecting device 40. The tracking device 62 tracks the defect position on the single-faced cardboard sheet D, which is identified by the defect position identifying device 61. The control device 47 operates the defective sheet outputting device 24 on the basis of tracking results from the tracking device 62.

As illustrated in FIGS. 2 to 4, the radiating device 45 is disposed at a position spaced apart from the guide roller 43 by a predetermined distance, and is fixed to a device main body (not illustrated) by an attachment bracket 71. The radiating device 45 is disposed so as to be opposed to the circumferential surface of the guide roller 43 and to correspond to the length of the guide roller 43 in an axis direction thereof, and can radiate parallel light toward the outer circumferential surface of the guide roller 43, that is, an area with the full width of the single-faced cardboard sheet D guided by the guide roller 43. The parallel light is a light that goes straight without the axis of light radiated toward the guide roller 43 radially propagating, in particular, in a case where the guide roller 43 is seen from the axis direction.

The image capturing device 46 is disposed at a position spaced apart from the guide roller 43 by a predetermined distance, and is fixed to the device main body by an attachment bracket 72. The image capturing device 46 is disposed so as to be opposed to the intermediate position of the guide roller 43 in the axis direction, and can capture an image of the outer circumferential surface of the guide roller 43, that is, the area with the full width of the single-faced cardboard sheet D guided by the guide roller 43. The image capturing device 46 is one line camera, and captures an image of a portion of flutes of the corrugated medium B. In this case, the image capturing device 46 can capture an image with one pixel in the transporting direction in which the single-faced cardboard sheet D is transported and a plurality of pixels in a width direction of the single-faced cardboard sheet D. For this reason, the image capturing device 46 is set to have an image capturing interval according to the transporting speed of the single-faced cardboard sheet D or the pitch of flutes of the medium B.

In the embodiment, although the image capturing device (line camera) 46 is disposed on the perpendicular line perpendicular to the single-faced cardboard sheet D, that is, a line along a diameter direction passing through the center of the guide roller 43, the radiating device 45 is disposed on a line at an angle (radiation angle) that is inclined through a predetermined angle relative to the perpendicular line (line along the diameter direction passing through the center of the guide roller 43) of the single-faced cardboard sheet D.

Figure 5:
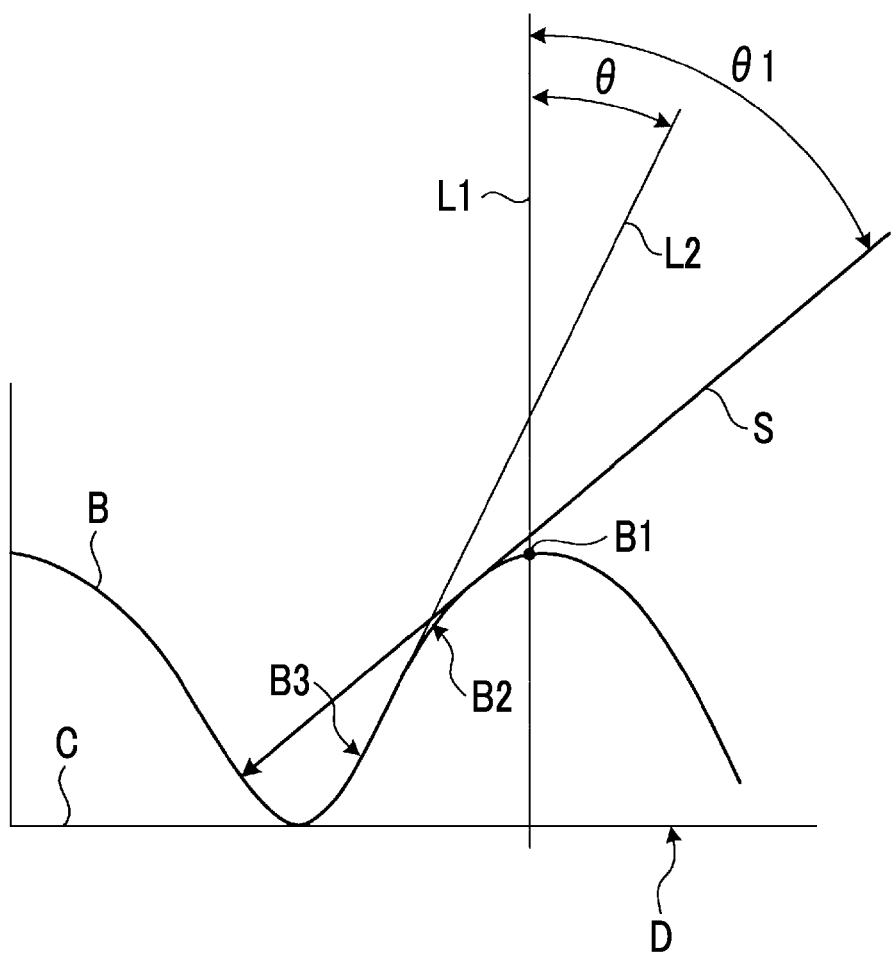
FIG. 5 is a schematic view for illustrating a radiation angle of the radiating device with respect to a medium of the single-faced cardboard sheet.
Figure 6A:
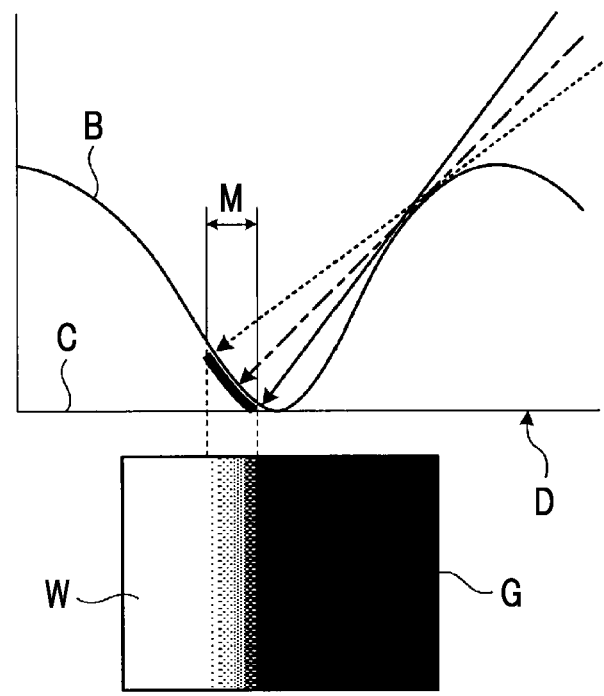
FIG. 6A is a schematic view that illustrates action of illumination light on the medium of the single-faced cardboard sheet and illustrates action of diffused light.
Figure 6B:
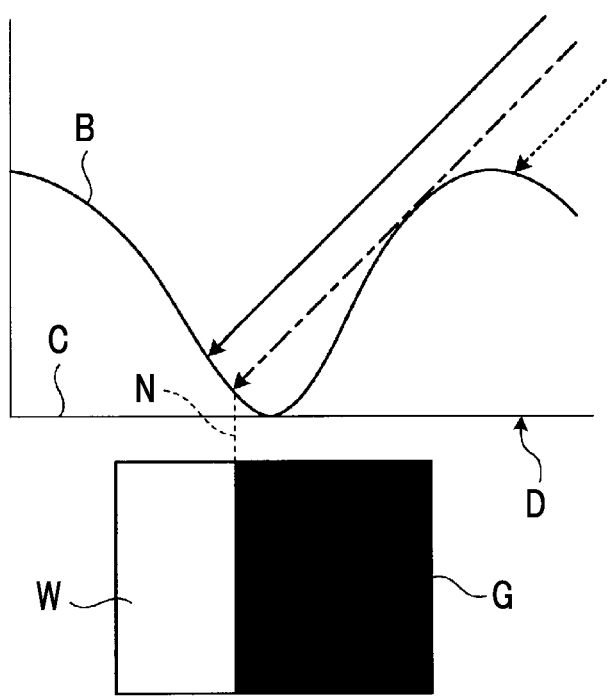
FIG. 6B is a schematic view that illustrates the action of the illumination light on the medium of the single-faced cardboard sheet and illustrates action of parallel light.

FIG. 5 is a schematic view for illustrating the radiation angle of the radiating device with respect to the medium of the single-faced cardboard sheet, FIG. 6 is a schematic view illustrating the action of illumination light on the medium of the single-faced cardboard sheet, FIG. 6A illustrates the action of diffused light, and FIG. 6B illustrates the action of parallel light.

As illustrated in FIG. 5, the single-faced cardboard sheet D is made by pasting the corrugated medium B to the top liner C, and is transported with the top liner C staying in contact with the guide roller 43 and the medium B facing outwards. Although the single-faced cardboard sheet D is supported by the guide roller 43 and arcuately travels, description is made herein as if the single-faced cardboard sheet linearly travels. A perpendicular line L1 perpendicular to the single-faced cardboard sheet D in the diameter direction is defined as a line passing through the center of the guide roller 43 and a flute top portion B1 of a flute of the medium B. A radiation angle $\theta 1$ of parallel light S radiated by the radiating device 45 is an angle relative to the perpendicular line L1, and the radiation angle $\theta 1$ is set to be larger than an angle $\theta$ between the perpendicular line L1 and an inclined line L2 along an inclined surface of the flute of the medium B. The flute of the medium B is formed of a first curve B2 in a convex shape facing outwards from the flute top portion B1 to a foot portion and a second curve B3 in a concave shape facing outwards, the inclined line L2 is tangent to a position on the first curve B2, which is the closest to the foot. Since the radiation angle $\theta 1$ of the parallel light S radiated by the radiating device 45 is set to an angle larger than the angle $\theta$ between the perpendicular line L1 and the inclined line L2, the radiated light can create the shadow of the flute.

The radiating device 45 radiates parallel light toward the medium B at the predetermined radiation angle $\theta 1$. As illustrated in FIG. 6A, in a case where radiated light from the radiating device 45 is not parallel light, a light portion W and a dark portion G are formed by the shadow of the flute of the medium B being formed due to the radiated light. However, for example, in a case where there are variations in a direction where light is radiated, the inclined surface is tangent to each of light beams having different radiation directions. Accordingly, a boundary between the light portion W and the dark portion G is generated for each of the light beams having different radiation directions. Therefore, a blurred region M is formed between the light portion W and the dark portion G, and thus it is difficult to define the length of the light portion W and the length of the dark portion G with high accuracy. On the other hand, as illustrated in FIG. 6B, in a case where radiated light from the radiating device 45 is parallel light, the shadow of a flute of the medium B is formed due to the radiated light, and thus the light portion W and the dark portion G are formed. Herein, since the radiated light is parallel light, a boundary line N between the light portion W and the dark portion G is clearly formed, and the length of the light portion W and the length of the dark portion G can be defined with high accuracy.

As shown in FIG. 2, the shadow image processing device 51 defines the light portion W and the dark portion G based on the shadow of each flute of the medium B from an image captured by the image capturing device 46. In this case, as described above, the image capturing device 46 (line camera) captures an image of the shadow of one flute of the corrugated medium B as an image with one pixel in the transporting direction in which the single-faced cardboard sheet D is transported and a plurality of pixels in the width direction of the single-faced cardboard sheet D. For this reason, the shadow image processing device 51 defines a plurality of the consecutive light portions W and dark portions G over a predetermined length of the single-faced cardboard sheet D by combining a plurality of images with one pixel×a plurality of pixels in the transporting direction in which the single-faced cardboard sheet D is transported.

In this case, the shadow image processing device 51 defines the light portions W and the dark portions G by adding up all image capturing data pieces of the light portions W and the dark portions G, from images of the light portions W and the dark portions G over the predetermined length of the single-faced cardboard sheet D, in the width direction of the single-faced cardboard sheet D. The shadow image processing device may define the light portions W and the dark portions G by adding up a part of image capturing data pieces of the light portions W and the dark portions G, from images of the light portions W and the dark portions G over the predetermined length of the single-faced cardboard sheet D, in the width direction of the single-faced cardboard sheet D.

The assessing device 52 assesses the quality of the single-faced cardboard sheet D by comparing the length of the light portion W and the length of the dark portion G defined by the shadow image processing device 51 with assessment values. In this case, the assessing device 52 assesses the quality by comparing the length of the light portion W with a first assessment value, and assesses the quality by comparing the length of the dark portion G with a second assessment value. That is, when the single-faced cardboard sheet D is transported, the light portions W and the dark portions G are defined alternately and consecutively, and the assessing device 52 assesses the quality. The quality assessment of the light portions W and the quality assessment of the dark portions G are consecutively performed.

In this case, when the radiation angle θ1 of the parallel light S from the radiating device 45 is set to a predetermined angle, the first assessment value and the second assessment value are set to reference values, which are obtained in advance from experiments, according to the shape of a flute of the medium B of the single-faced cardboard sheet D. Then, predetermined margins are added to the reference values to set a first assessment range and a second assessment range. That is, if the length of the light portion W, which is processed and acquired by the shadow image processing device 51, is within the first assessment range, the single-faced cardboard sheet D is assessed as non-defective, and if the length of the light portion is not within the first assessment range, the single-faced cardboard sheet D is assessed as defective. Similarly, if the length of the dark portion G, which is processed and acquired by the shadow image processing device 51, is within the second assessment range, the single-faced cardboard sheet D is assessed as non-defective, and if the length is not within the second assessment range, the single-faced cardboard sheet D is assessed as defective.

A method of setting the first assessment value and the second assessment value is not limited to this method. For example, the first assessment value and the second assessment value may be a value calculated by averaging out the lengths of the plurality of light portions W, on which quality assessment is already completed, and a value calculated by averaging out the lengths of the plurality of dark portions G, on which quality assessment is already completed, respectively, that is, so-called moving average values. In this case, the number (predetermined number) of the lengths of the light portions W, on which quality assessment is already completed, and the number (predetermined number) of the lengths of the dark portions G, on which quality assessment is already completed, may be set as appropriate. The first assessment value and the second assessment value, which are based on the reference values described above, may be used until a predetermined number of image capturing data pieces on the length of the light portion W and the length of the dark portion G can be collected.

The first assessment value and the second assessment value are set for each type of the single-faced cardboard sheet D (type of the medium B), and are stored in the memory device 53. In particular, in a case where the shape (height or pitch) of the medium B of the single-faced cardboard sheet D is different, the shape of a shadow is different, and thus the length of the light portion W and the length of the dark portion G are different. For this reason, a plurality of types of first assessment values and second assessment values according to the shape of the medium B are set.

Figure 8:
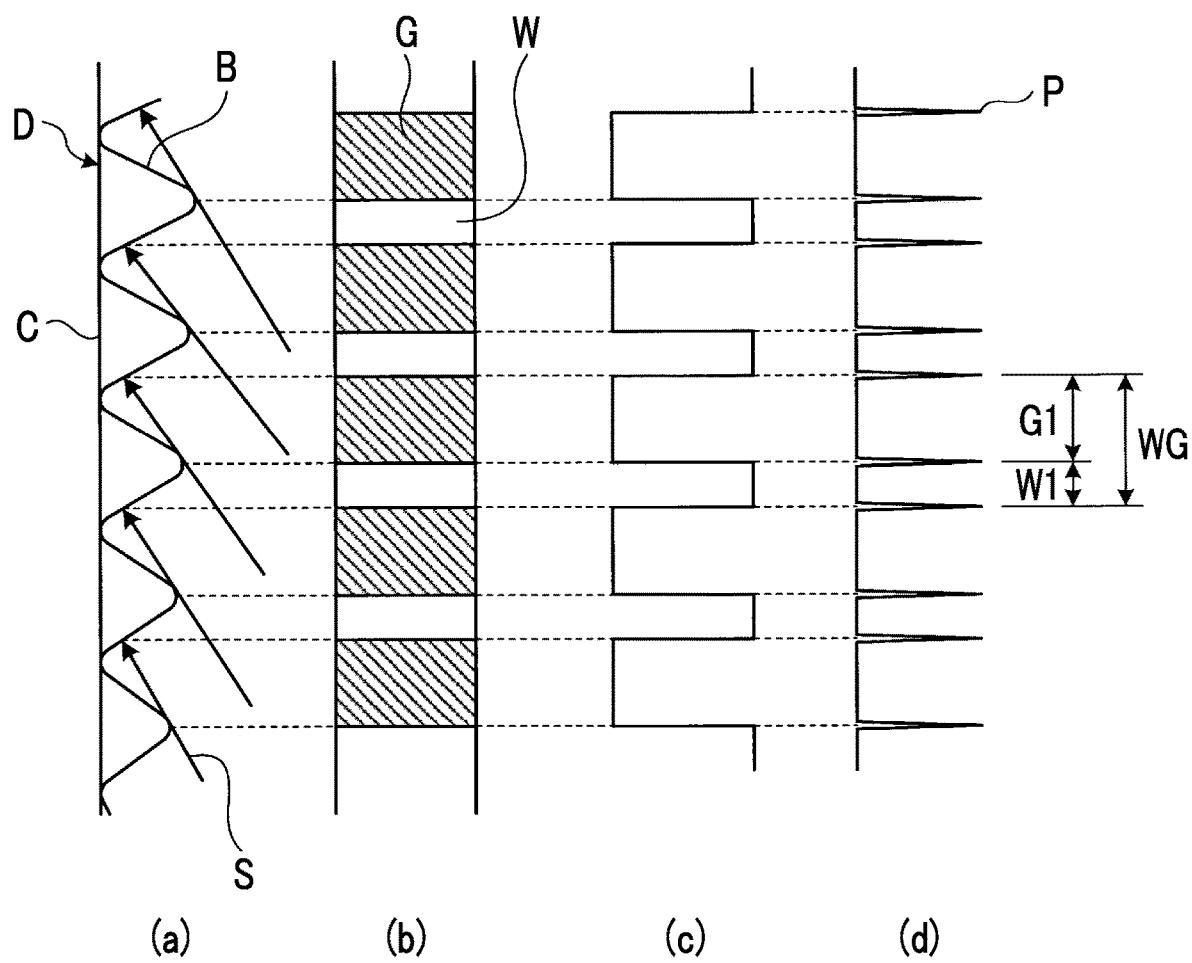
FIG. 8 is an explanatory view for illustrating the image processing method.
Figure 9A:
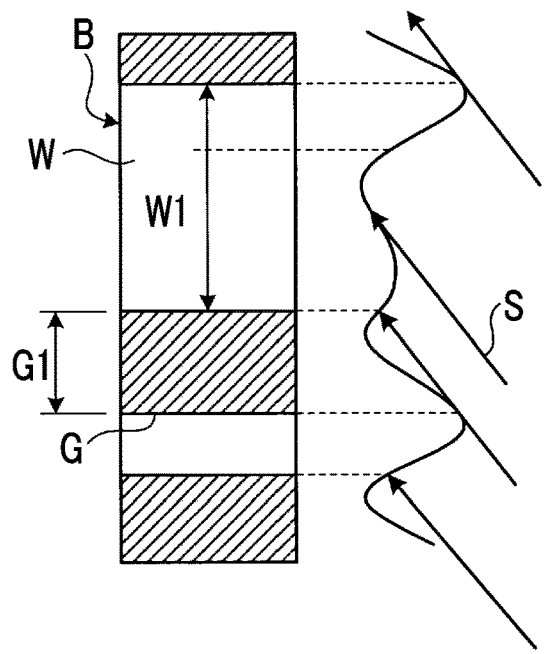
FIG. 9A is a schematic view that illustrates a modification example of a medium of a single-faced cardboard sheet and illustrates a crushed flute.
Figure 9B:
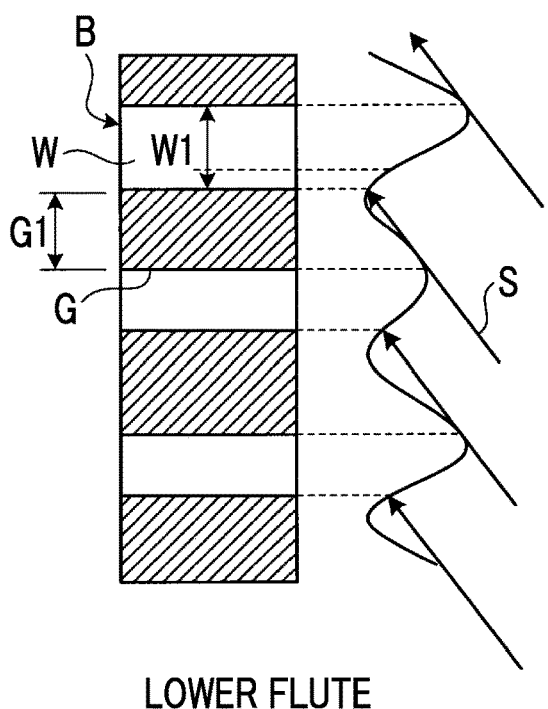
FIG. 9B is a schematic view that illustrates the modification example of the medium of the single-faced cardboard sheet and illustrates a lower flute.
Figure 9C:
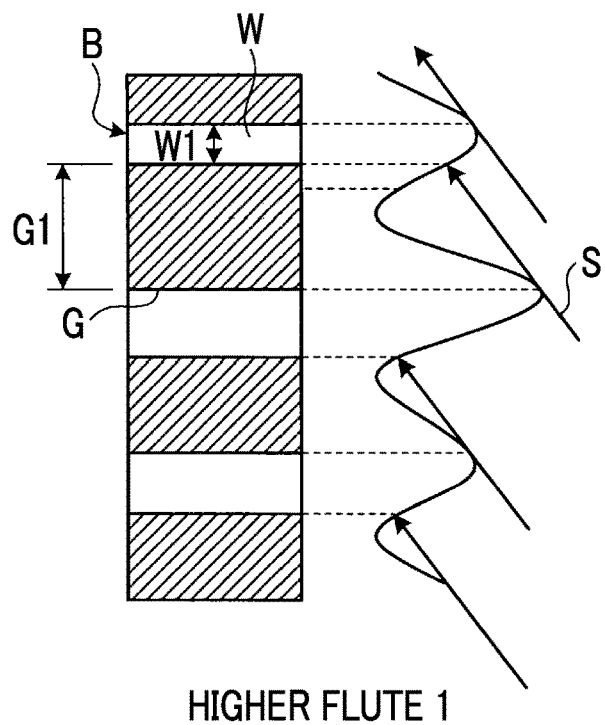
FIG. 9C is a schematic view that illustrates the modification example of the medium of the single-faced cardboard sheet and illustrates a higher flute 1.
Figure 9D:
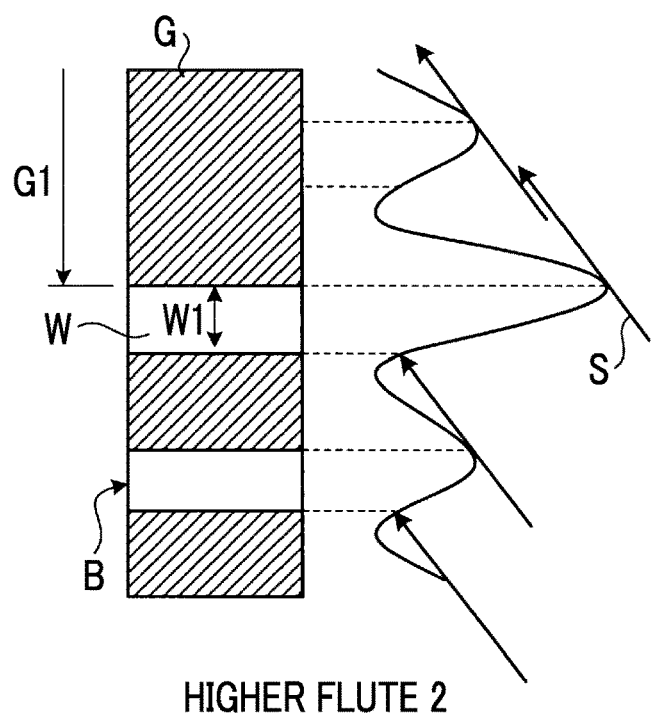
FIG. 9D is a schematic view that illustrates the modification example of the medium of the single-faced cardboard sheet and illustrates a higher flute 2.

Herein, the processing of the shadow image processing device 51 and the assessing device 52 will be described in detail. FIG. 7 is a flow chart for illustrating an image processing method, FIG. 8 is an explanatory view for illustrating the image processing method, FIG. 9 is a schematic view illustrating a modification example of a medium of a single-faced cardboard sheet, FIG. 9A illustrates a crushed flute, FIG. 9B illustrates a lower flute, and FIGS. 9C and 9D illustrate a higher flute.

As shown in FIG. 7, a captured shadow image of the medium B is projected in Step S11. That is, as illustrated in FIGS. 8(*a*), (*b*), and (*c*), in a shadow image obtained by arranging a plurality of images with one pixel×a plurality of pixels, which are captured in the transporting direction, image capturing data pieces of the light portion W and the dark portion G are added up in the width direction of the single-faced cardboard sheet D, thereby calculating added luminance. Referring back to FIG. 7, in Step S12, noise is removed by smoothing out the added luminance in the transporting direction. As illustrated in FIG. 8(*d*), in Step S13, a difference in the added luminance between pixels adjacent to each other in the transporting direction is found, that is, a difference is acquired. Referring back to FIG. 7, in Step S14, since the value of a difference is large at an edge between the light portion W and the dark portion G, a peak value P at which the value of a difference is large is extracted. In Step S15, a length W1 of the light portion W and a length G1 of the dark portion G are calculated.

In Step S16, it is assessed that whether or not the length W1 of the light portion W is within the first assessment range by comparing the length W1 of the light portion W with the first assessment range. If it is assessed that the length W1 of the light portion W is within the first assessment range, the single-faced cardboard sheet is non-defective and processing transitions to Step S17. In Step S17, it is assessed that whether or not the length G1 of the dark portion G is within the second assessment range by comparing a length G1 of the dark portion G with the second assessment range. If it is assessed that the length G1 of the dark portion G is within the second assessment range, the single-faced cardboard sheet is non-defective and processing transitions to Step S18. In this step, one flute of the medium B is assessed as non-defective. On the other hand, if it is assessed that the length W1 of the light portion W is not within the first assessment range in Step S16, the single-faced cardboard sheet is defective and processing transitions to Step S19. If it is assessed that the length G1 of the dark portion G is not within the second assessment range in Step S17, the single-faced cardboard sheet is defective and processing transitions to Step S19. In Step S19, one flute of the medium B is assessed as defective, and in Step S20, the double-faced cardboard sheet F including the defective flute is output from the transport line to the outside. Although the length W1 of the light portion W is compared with the first assessment value and a length G1 of the dark portion G is compared with the second assessment value, a total value WG of the length W1 of the light portion W and the length G1 of the dark portion G may be compared with an assessment value as illustrated in FIG. 8.

Herein, a specific quality assessment on the defective medium B will be described. A defect in the medium B illustrated in FIG. 9A is attributable to a crushed flute. Since a flute is crushed, the length W1 of the light portion W becomes larger and thus becomes abnormal although the length G1 of the dark portion G is normal. A defect in the medium B illustrated in FIG. 9B is attributable to a lower flute. Since a flute is lower, the length G1 of the dark portion G becomes smaller and thus becomes abnormal, and the length W1 of the light portion W becomes larger and thus becomes abnormal. A defect in the medium B illustrated in FIG. 9C is attributable to a higher flute 1. Since a flute is higher, the length G1 of the dark portion G becomes larger and thus becomes abnormal, and the length W1 of the light portion W becomes smaller and thus becomes abnormal. A defect in the medium B illustrated in FIG. 9D is attributable to a higher flute 2. Since a flute is higher, the adjacent dark portions G become continuous. Thus, the length G1 becomes larger and becomes abnormal. In this case, although one light portion W is not present, the lengths W1 of the light portions W before and after this light portion are normal.

If a defective portion is generated at a predetermined position on the medium B of the single-faced cardboard sheet D, the position of the generated defective portion is tracked and the double-faced cardboard sheet F including the defective portion is excluded. The defect position identifying device 61 calculates a distance by which the single-faced cardboard sheet D (double-faced cardboard sheets E and F) is transported from a time (timing) when the image capturing device 46 captures an image of a flute of the medium B to a time (timing) when the assessing device 52 assesses a defect, and identifies the defect position of the flute of the medium B on the basis of the corrugated fiberboard transported distance. The tracking device 62 tracks the defect position of the flute of the medium B which moves over time, and estimates a time (timing) when the cut double-faced cardboard sheet F including the defect position reaches the defective sheet outputting device 24. On the basis of tracking results from the tracking device 62, the control device 47 operates the defective sheet outputting device 24 when the double-faced cardboard sheet F including the defect position has reached the defective sheet outputting device 24.

As described above, the corrugated board sheet defect detecting device of the first embodiment detects a defect in the single-faced cardboard sheet D transported by the guide roller 43, and is provided with the radiating device 45 that radiates the parallel light S toward the medium B at the radiation angle θ1 which is inclined through a predetermined prescribed angle relative to the perpendicular line L1 perpendicular to the single-faced cardboard sheet D, the image capturing device 46 that captures an image of a portion of the medium B irradiated with the parallel light, the shadow image processing device 51 that defines the light portion W and the dark portion G in the transporting direction in which the single-faced cardboard sheet D is transported on the basis of the image captured by the image capturing device 46, and the assessing device 52 that assess the quality by comparing the length W1 of the light portion W and the length G1 of the dark portion G defined by the shadow image processing device 51 with prescribed assessment values.

Accordingly, when the radiating device 45 radiates parallel light toward the medium B of the single-faced cardboard sheet D transported by the guide roller 43, the image capturing device 46 captures an image of a portion of the medium B irradiated with parallel light, the shadow image processing device 51 defines the light portion W and the dark portion G in the transporting direction in which the single-faced cardboard sheet D is transported on the basis of the captured image, and the assessing device 52 assesses the quality of the single-faced cardboard sheet D by comparing the length W1 of the light portion W and the length G1 of the dark portion G with the assessment values. At this time, a defect in the medium B, that is, a defect in the double-faced cardboard sheet F is detected on the basis of the lengths W1 and G1 of the light portion W and the dark portion G which are formed by the shadow of a flute of the corrugated medium B. For this reason, a crushing defect, a height defect, and a length defect of a flute of the medium B can be detected, and a defect in the double-faced cardboard sheet F caused by the deformation of corrugated flutes of the medium B can be detected with high accuracy.

Herein, by the radiating device 45 radiating the parallel light S to the single-faced cardboard sheet D, a boundary line between the light portion W and the dark portion G is clearly formed, and the length of the light portion W and the length of the dark portion G can be defined with high accuracy.

By setting the guide roller 43 having a curved surface as a guide member, the single-faced cardboard sheet D is likely to go along the guide roller 43, and the single-faced cardboard sheet D is guided by the guide roller 43 while staying in contact with the guide roller. As the guide roller 43 rotates, the single-faced cardboard sheet D can be smoothly guided while the vibration of the single-faced cardboard sheet D is being suppressed.

In the corrugated board sheet defect detecting device of the first embodiment, the assessing device 52 assesses the quality by comparing the length W1 of the light portion W with the first assessment value and assesses the quality by comparing the length G1 of the dark portion G with the second assessment value. Accordingly, an undetected defect in the medium B reduces and a defect detection accuracy can be improved by assessing the quality of the medium B based on the abnormality of the length W1 of the light portion W and the abnormality of the length G1 of the dark portion G.

In the corrugated board sheet defect detecting device of the first embodiment, the first assessment value and the second assessment value are a value calculated by averaging out the lengths W1 of the plurality of light portions W, on which quality assessment is already completed, and a value calculated by averaging out the lengths G1 of the plurality of dark portions G, on which quality assessment is already completed, respectively. Accordingly, even in a case where the shape of a flute of the medium B has changed due to operating conditions of the corrugating machine 10, this is not assessed as a defect and the occurrence of false detection of a defect can be suppressed by setting the assessment values to a value obtained by averaging out the lengths W1 of a predetermined number of the light portions W and a value obtained by averaging out the lengths G1 of a predetermined number of the dark portions G, respectively, that is so-called, moving average values.

In the corrugated board sheet defect detecting device of the first embodiment, the first assessment value and the second assessment value are set to be within the first assessment range and the second assessment range, which are obtained by adding a predetermined margin to each of the prescribed reference values of lengths of the light portion W and the dark portion G. Accordingly, after the quality of the double-faced cardboard sheet F is ensured by assessing the quality in consideration of variations in the shapes of flutes of the medium B of the single-faced cardboard sheet D occurred when manufacturing, the occurrence of false detection of a defect can be suppressed.

In the corrugated board sheet defect detecting device of the first embodiment, the first assessment value and the second assessment value are set for each type of the single-faced cardboard sheet D, and are stored in the memory device 53. Accordingly, even when the type of the single-faced cardboard sheet D is changed, a high-precision quality assessment is possible and a quality assessment accuracy can be improved by changing each assessment value according to the heights or widths of flutes of the medium B.

In the corrugated board sheet defect detecting device of the first embodiment, the radiation angle θ1 of the radiating device 45 is an angle relative to the perpendicular line L1 perpendicular to the single-faced cardboard sheet D passing through a flute top portion of the medium B, and is set to an angle larger than an angle between the perpendicular line L1 and the inclined line L2 along the inclined surface of the flute of the medium B. Accordingly, by setting the radiation angle θ1 of the radiating device 45 to an optimal angle, the shadow of the flute of the medium B can be clearly formed by parallel light.

In the corrugated board sheet defect detecting device of the first embodiment, the image capturing device 46 is a line camera. Accordingly, even in a case where a distance between the line camera and the single-faced cardboard sheet D changes according to a position in the transporting direction, an image can be captured without out of focus.

In the corrugated board sheet defect detecting device of the first embodiment, the image capturing device (line camera) 46 captures an image of a radiated portion of a flute of the medium B, and the shadow image processing device 51 defines the plurality of consecutive light portions W and the dark portions G in the transporting direction in which the single-faced cardboard sheet D is transported by combining a plurality of images of flutes of the medium B captured by the image capturing device 46. Accordingly, the quality of a plurality of flutes of the medium B can be comprehensively assessed, and the number of processing steps of the assessing device 52 can be reduced.

In the corrugated board sheet defect detecting device of the first embodiment, the shadow image processing device 51 defines the light portion W and the dark portion G by adding up image capturing data pieces in a predetermined pixel unit in the width direction of the single-faced cardboard sheet D on the basis of images captured by the image capturing device 46. Accordingly, the light portion W and the dark portion G can be clearly displayed by removing noise.

In the corrugated board sheet defect detecting device of the first embodiment, the shadow image processing device 51 defines the light portion W and the dark portion G by adding up a part of image capturing data pieces in the width direction of the single-faced cardboard sheet D on the basis of images captured by the image capturing device 46. Accordingly, by removing noise, the number of processing steps of the shadow image processing device 51 reduces, and thus processing time can be shortened.

In the corrugated board sheet defect detecting device of the first embodiment, the image capturing device 46 is set to have an image capturing interval according to the transporting speed of the single-faced cardboard sheet D or the pitch of flutes of the medium B. Accordingly, by setting an image capturing interval according to the transporting speed of the single-faced cardboard sheet D or the pitch of flutes of the medium B since the shapes of flutes of the medium B are different for each type of the single-faced cardboard sheet D, an optimal image capturing interval according to the shapes of the flutes of the medium B is set, and thus images of the shadows of the flutes of the medium B formed by parallel light can be clearly captured.

The corrugated board sheet defect detecting device of the first embodiment is provided with the display device 48 that displays assessment results from the assessing device 52. Accordingly, quality assessment results of the single-faced cardboard sheet D are displayed onto the display device 48, and an operator can check the status of occurrence of a defect at an early stage.

In addition, the corrugated board sheet defect removing device of the first embodiment is provided with the corrugated board sheet defect detecting device 40 and the defective sheet outputting device 24 that outputs the double-faced cardboard sheet F which is cut out to a predetermined length including a defective point detected by the corrugated board sheet defect detecting device 40.

Accordingly, the corrugated board sheet defect detecting device 40 detects a defect in the medium B, that is, a defect in the double-faced cardboard sheet F on the basis of the lengths W1 and G1 of the light portion W and the dark portion G which are formed by the shadow of a flute of the corrugated medium B. For this reason, a crushing defect, a height defect, and a length defect of a flute of the medium B can be detected, a defect in the double-faced cardboard sheet F caused by the deformation of a corrugated flute of the medium B can be detected with high accuracy, and only the non-defective double-faced cardboard sheet F can be transported.

The corrugated board sheet defect removing device of the first embodiment is provided with the defect position identifying device 61 that identifies a defect position detected by the corrugated board sheet defect detecting device 40, the tracking device 62 that tracks the defect position identified by the defect position identifying device 61, and the control device 47 that operates the defective sheet outputting device 24 on the basis of tracking results from the tracking device 62. Accordingly, if a defect in the single-faced cardboard sheet D is detected, the defect position identifying device 61 identifies a defect position on the single-faced cardboard sheet D and the tracking device 62 tracks the defect position to operate the defective sheet outputting device 24. Therefore, the defective double-faced cardboard sheet F can be reliably output and removed from the transport line.

In the corrugated board sheet defect removing device of the first embodiment, the defect position identifying device 61 identifies a defect position based on a distance by which the single-faced cardboard sheet D is transported from a time when the image capturing device 46 captures an image to a time when the assessing device 52 assesses a defect, the tracking device 62 estimates a time when the defect position reaches the defective sheet outputting device 24, and the control device 47 operates the defective sheet outputting device 24 at a time when the defect position reaches the defective sheet outputting device. Accordingly, the defective double-faced cardboard sheet F can be reliably output and removed from the transport line.

The corrugated board sheet manufacturing device of the embodiment is provided with the single facer 15 that manufactures the single-faced cardboard sheet D by pasting the top liner C to the corrugated core paper (medium B), the double facer 20 that manufactures the double-faced cardboard sheet E by pasting the bottom liner A to the medium B side of the single-faced cardboard sheet D manufactured by the single facer 15, and the corrugated board sheet defect removing device 60.

Accordingly, the single facer 15 manufactures the single-faced cardboard sheet D by pasting the top liner C to the corrugated core paper (medium B), and the double facer 20 manufactures the double-faced cardboard sheet E by pasting the bottom liner A to the medium B side of the single-faced cardboard sheet D. At this time, the corrugated board sheet defect removing device 60 detects a defect in the single-faced cardboard sheet D, and the defective sheet outputting device 24 outputs and removes the double-faced cardboard sheet F, which is cut out to a predetermined length including a defective point, from the transport line. For this reason, a crushing defect, a height defect, and a length defect of a flute of the medium B can be detected, a defect in the double-faced cardboard sheet F caused by the deformation of a corrugated flute of the medium B can be detected with high accuracy, and only the non-defective double-faced cardboard sheet F can be transported.

Second Embodiment

Figure 10:
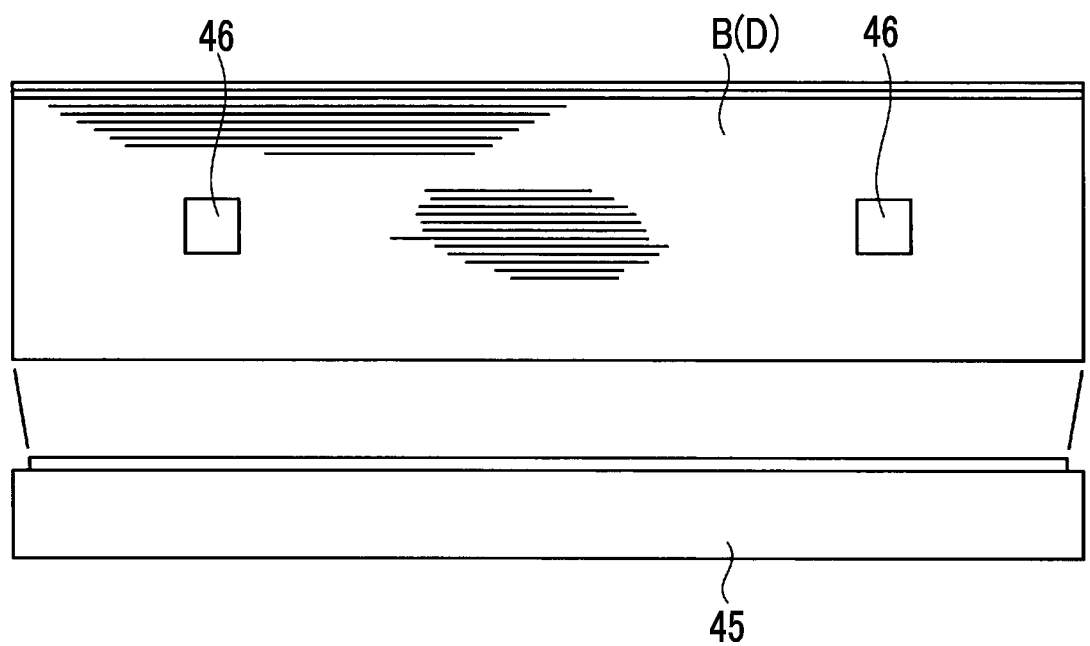
FIG. 10 is a front view illustrating a disposition configuration of a radiating device and an image capturing device, which represent a corrugated board sheet defect detecting device of a second embodiment, with respect to a single-faced cardboard sheet.

FIG. 10 is a front view illustrating a disposition configuration of a radiating device and an image capturing device, which represent a corrugated board sheet defect detecting device of a second embodiment, with respect to a single-faced cardboard sheet. The basic configuration of the corrugated board sheet defect detecting device of the embodiment is almost the same configuration as the first embodiment described above. Description will be made with reference to FIG. 2, members having the same configuration as in the first embodiment described above will be assigned with the same reference signs, and description thereof will be omitted.

In the second embodiment, as illustrated in FIG. 2, the corrugated board sheet defect detecting device 40 has the guide rollers 41, 42, 43, and 44, the radiating device 45, the image capturing device 46, the control device 47, and the display device 48. The control device 47 has the shadow image processing device 51, the assessing device 52, and the memory device 53.

The radiating device 45 radiates parallel light toward the medium B at a radiation angle that is inclined through a predetermined prescribed angle relative to a perpendicular line perpendicular to the single-faced cardboard sheet D. The image capturing device 46 captures an image of a portion (shadow) of the medium B irradiated with the parallel light. The shadow image processing device 51 defines a light portion and a dark portion in a transporting direction in which the single-faced cardboard sheet D is transported on the basis of an image captured by the image capturing device 46. The assessing device 52 assesses the quality of the single-faced cardboard sheet D by comparing the length of the light portion and the length of the dark portion defined by the shadow image processing device 51 with prescribed assessment values.

The image capturing devices 46 are a plurality of (two, in the embodiment) line cameras, and each capture an image of a portion of a flute of the corrugated medium B, as illustrated in FIG. 10. In this case, the image capturing devices 46 each can capture an image with one pixel in the transporting direction in which the single-faced cardboard sheet D is transported and a plurality of pixels in the width direction of the single-faced cardboard sheet D. For this reason, the image capturing devices 46 are set to have an image capturing interval according to the transporting speed of the single-faced cardboard sheet D or the pitch of flutes of the medium B.

As described above, in the corrugated board sheet defect detecting device of the second embodiment, the plurality of line cameras are disposed as the image capturing devices 46 in the width direction of the single-faced cardboard sheet D.

Accordingly, a distance between each of the image capturing devices 46 and the medium B of the single-faced cardboard sheet D can be shortened, and positions for disposing the image capturing devices 46 can be easily secured by disposing the plurality of image capturing devices (line cameras) 46 in the width direction of the single-faced cardboard sheet D. An image capturing accuracy can be improved by making resolution higher.

Third Embodiment

Figure 11:
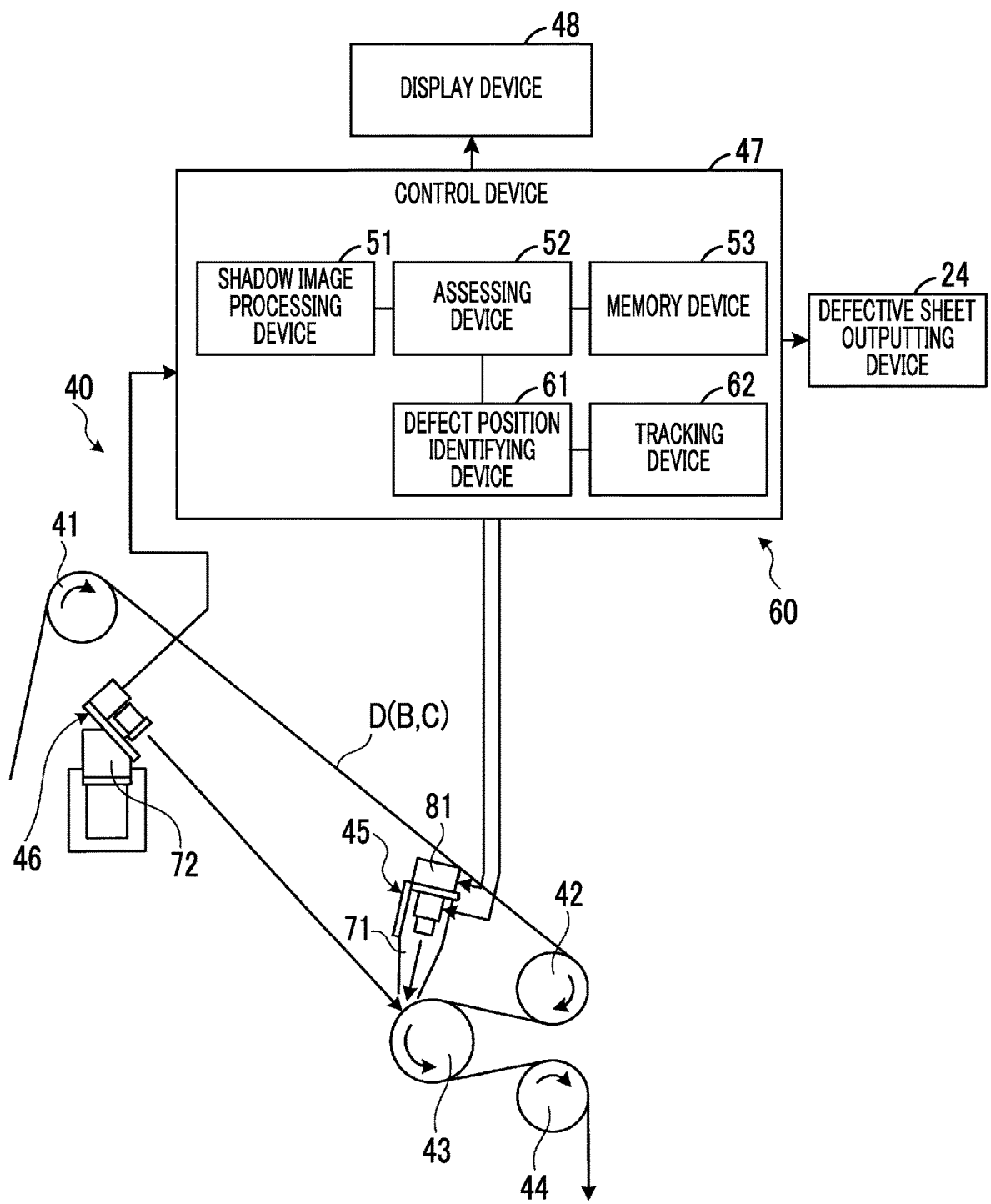
FIG. 11 is a schematic configuration view illustrating a corrugated board sheet defect detecting device of a third embodiment.

FIG. 11 is a schematic configuration view illustrating a corrugated board sheet defect detecting device of a third embodiment. Members having the same functions as the embodiment described above will be assigned with the same reference signs and detailed description thereof will be omitted.

In the third embodiment, as illustrated in FIG. 11, the corrugated board sheet defect detecting device 40 has the guide rollers 41, 42, 43, and 44, the radiating device 45, the image capturing device 46, the control device 47, and the display device 48. The control device 47 has the shadow image processing device 51, the assessing device 52, and the memory device 53.

The radiating device 45 radiates parallel light toward the medium B at a radiation angle that is inclined through a predetermined prescribed angle relative to a perpendicular line perpendicular to the single-faced cardboard sheet D. The image capturing device 46 captures an image of a portion (shadow) of the medium B irradiated with the parallel light. The shadow image processing device 51 defines a light portion and a dark portion in the transporting direction in which the single-faced cardboard sheet D is transported on the basis of an image captured by the image capturing device 46. The assessing device 52 assesses the quality of the single-faced cardboard sheet D by comparing the length of the light portion and the length of the dark portion defined by the shadow image processing device 51 with prescribed assessment values.

The radiating device 45 is disposed at a position spaced apart from the guide roller 43 by a predetermined distance, and is fixed to the device main body by the attachment bracket 71. The radiating device 45 is disposed so as to be opposed to the circumferential surface of the guide roller 43 and to correspond to the length of the guide roller 43 in an axis direction thereof, and can radiate parallel light toward the outer circumferential surface of the guide roller 43, that is, an area with the full width of the single-faced cardboard sheet D guided by the guide roller 43. The radiating device 45 is provided with a radiation angle changing device 81 that changes the radiation angle $\theta 1$. The radiation angle changing device 81 can cause the radiating device 45 to revolve with respect to the attachment bracket 71, and can cause the radiating device 45 to revolve around a revolving axis along the axis direction of the guide roller 43, which is a fulcrum. The radiation angle $\theta 1$ may be changed by moving the radiating device 45 along a guide rail.

As described above, the corrugated board sheet defect detecting device of the third embodiment is provided with the radiation angle changing device 81 that changes the radiation angle $\theta 1$ of the radiating device 45.

Accordingly, even when the type of the single-faced cardboard sheet D has changed, the shadow of a flute of the medium B can be clearly formed by parallel light by the radiation angle changing device 81 changing the radiation angle θ1 of the radiating device 45 according to the shape of a flute of the medium B since the shape of a flute of the medium B is different for each type of the single-faced cardboard sheet D.

Fourth Embodiment

Figure 12:
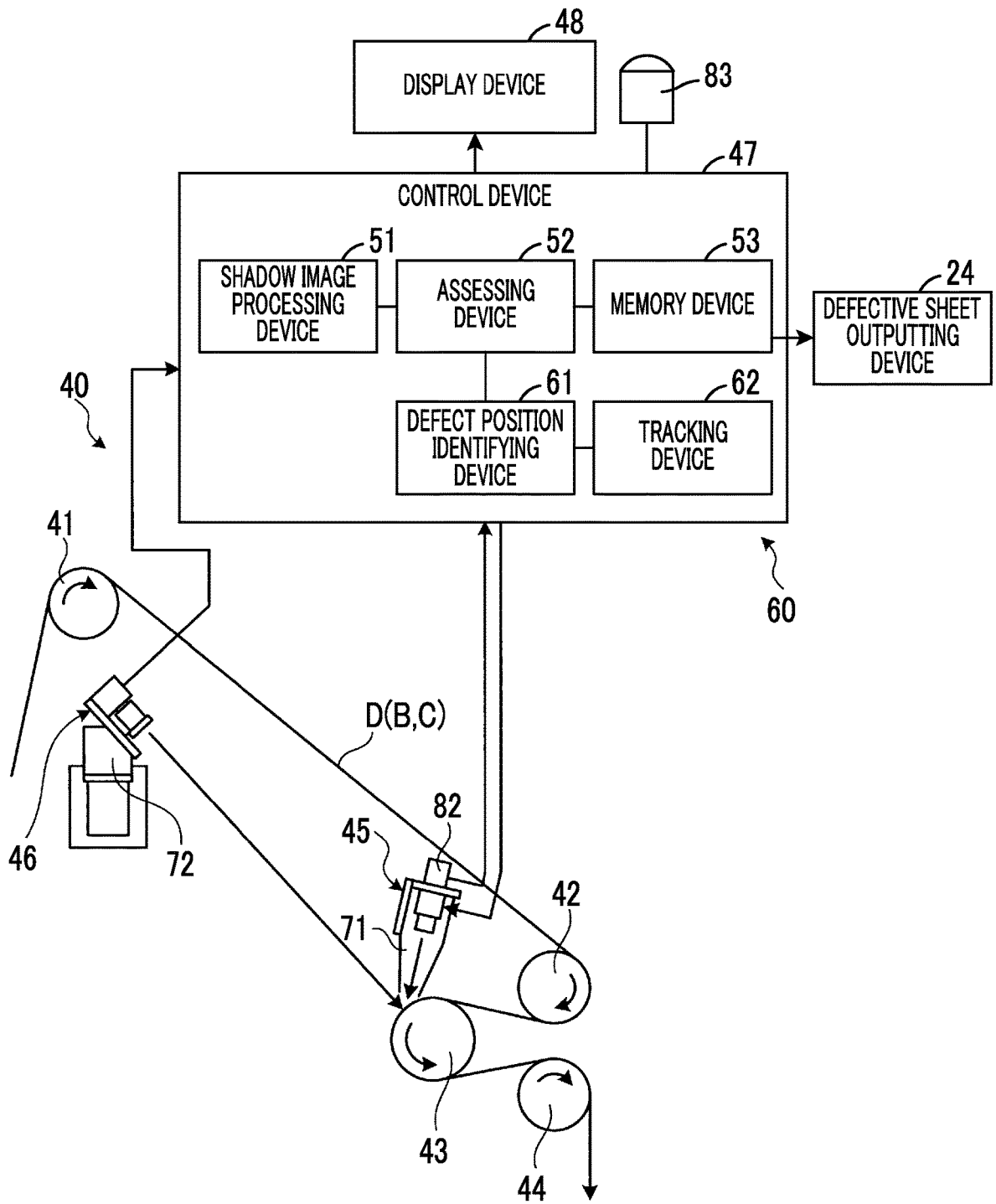
FIG. 12 is a schematic configuration view illustrating a corrugated board sheet defect detecting device of a fourth embodiment.

FIG. 12 is a schematic configuration view illustrating a corrugated board sheet defect detecting device of a fourth embodiment. Members having the same functions as the embodiment described above will be assigned with the same reference signs and detailed description thereof will be omitted.

In the fourth embodiment, as illustrated in FIG. 12, the corrugated board sheet defect detecting device 40 has the guide rollers 41, 42, 43, and 44, the radiating device 45, the image capturing device 46, the control device 47, and the display device 48. The control device 47 has the shadow image processing device 51, the assessing device 52, and the memory device 53.

The radiating device 45 radiates parallel light toward the medium B at a radiation angle that is inclined through a predetermined prescribed angle relative to a perpendicular line perpendicular to the single-faced cardboard sheet D. The image capturing device 46 captures an image of a portion (shadow) of the medium B irradiated with the parallel light. The shadow image processing device 51 defines a light portion and a dark portion in the transporting direction in which the single-faced cardboard sheet D is transported on the basis of an image captured by the image capturing device 46. The assessing device 52 assesses the quality of the single-faced cardboard sheet D by comparing the length of the light portion and the length of the dark portion defined by the shadow image processing device 51 with prescribed assessment values.

The radiating device 45 is disposed at a position spaced apart from the guide roller 43 by a predetermined distance, and is fixed to the device main body by the attachment bracket 71. The radiating device 45 is disposed so as to be opposed to the circumferential surface of the guide roller 43 and to correspond to the length of the guide roller 43 in an axis direction thereof, and can radiate parallel light toward the outer circumferential surface of the guide roller 43, that is, an area with the full width of the single-faced cardboard sheet D guided by the guide roller 43. A vibration detection device 82 that detects the vibration of the radiating device 45 and an alarm device 83 that issues an alarm are provided. The control device 47 (assessing device 52) operates the alarm device 83 if a detection value from the vibration detection device 82 exceeds a prescribed vibration reference value.

That is, if the radiating device 45 vibrates due to some external factors, parallel light radiated to the medium B is blurred, and thus it is difficult to form a clear shadow. Then, the image capturing device 46 cannot obtain a clear image of a flute of the medium B, affecting the accuracy of quality assessment of the single-faced cardboard sheet D. If the detection value of vibration of the radiating device 45 exceeds the vibration reference value, the alarm device 83 issues an alarm. When an operator hears this alarm, a part of the single-faced cardboard sheet D which is being assessed at that time can be checked firsthand, and the quality of the single-faced cardboard sheet D is assessed.

The vibration reference value is set according to the degree of deterioration of a captured image caused by the blur of parallel light radiated onto the medium B, and is acquired in advance through experiments. Although the vibration detection device 82 that detects the vibration of the radiating device 45 is provided, a vibration detection device that detects the vibration of the image capturing device 46 may be provided. In addition, antivibration rubber may be provided between the radiating device 45 and the attachment bracket 71, or between the image capturing device 46 and the attachment bracket 72.

As described above, the corrugated board sheet defect detecting device of the fourth embodiment is provided with the vibration detection device 82 that detects the vibration of at least one of the radiating device 45 and the image capturing device 46 and the alarm device 83 that issues an alarm. If the detection value from the vibration detection device 82 exceeds the vibration reference value, the control device 47 operates the alarm device 83.

Accordingly, if the radiating device 45 vibrates, there is a possibility that parallel light blurs and it is difficult to form a clear shadow. Thus, the image capturing device 46 cannot obtain an appropriate image of a flute of the medium B. For this reason, if the detection value of vibration of the radiating device 45 exceeds the vibration reference value, an alarm is issued. Thus, an operator can recheck firsthand the quality assessment of the double-faced cardboard sheet F, which is being assessed when the vibration occurs, and thus a quality assessment accuracy can be improved.

Fifth Embodiment

Figure 13:
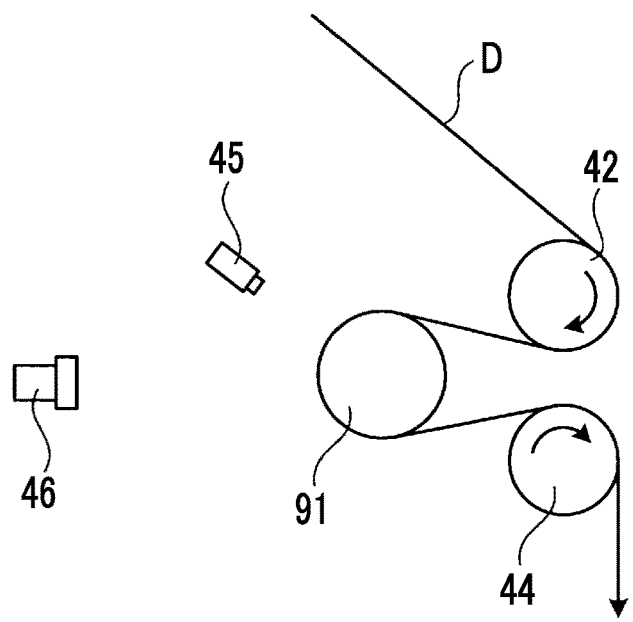
FIG. 13 is a schematic configuration view illustrating a corrugated board sheet defect detecting device of a fifth embodiment.

FIG. 13 is a schematic configuration view illustrating a corrugated board sheet defect detecting device of a fifth embodiment, and FIGS. 14 to 17 are schematic configuration views illustrating a modification example of a guide member. Members having the same functions as the embodiment described above will be assigned with the same reference signs and detailed description thereof will be omitted.

As illustrated in FIG. 13, the corrugated board sheet defect detecting device of the fifth embodiment has the guide rollers 42 and 44, the radiating device 45, the image capturing device 46, and a columnar body (or cylindrical body) 91, which is a guiding device.

The traveling single-faced cardboard sheet D is guided by the guide roller 42, the columnar body 91, and the guide roller 44. When the single-faced cardboard sheet D is guided by the columnar body 91 while staying in contact with the columnar body, the radiating device 45 radiates parallel light toward the medium B of the single-faced cardboard sheet D transported by the columnar body 91, and the image capturing device 46 captures an image of a portion of the medium B irradiated with the parallel light.

In the fifth embodiment, since the columnar body (or, cylindrical body) 91 is set as the guide member, a single-faced cardboard sheet is guided by the columnar body 91 and the vibration of the single-faced cardboard sheet D can be suppressed.

Figure 14:
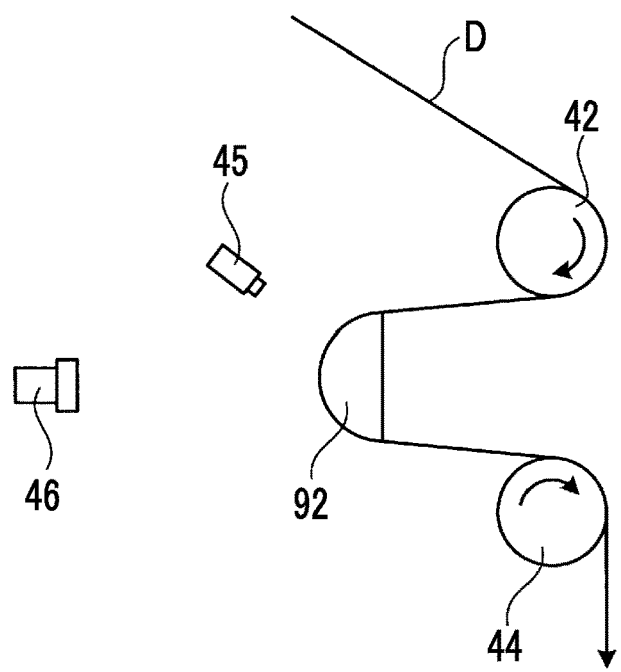
FIG. 14 is a schematic configuration view illustrating a modification example of a guide member.

The guiding device is not limited to the columnar body (or cylindrical body) 91. As illustrated in FIG. 14, a corrugated board sheet defect detecting device of a first modification example of the fifth embodiment has the guide rollers 42 and 44, the radiating device 45, the image capturing device 46, and a semicolumnar body (or semicylindrical body) 92, which is a guiding device.

The traveling single-faced cardboard sheet D is guided by the guide roller 42, the semicolumnar body 92, and the guide roller 44. When the single-faced cardboard sheet D is guided by the semicolumnar body 92 while staying in contact with the semicolumnar body, the radiating device 45 radiates parallel light toward the medium B of the single-faced cardboard sheet D transported by the semicolumnar body 92, and the image capturing device 46 captures an image of a portion of the medium B irradiated with the parallel light.

In the first modification example, since the semicolumnar body (or, semicylindrical body) 92 is set as the guide member, a single-faced cardboard sheet is guided by a curved surface of the semicolumnar body 92 and the vibration of the single-faced cardboard sheet D can be suppressed.

Figure 15:
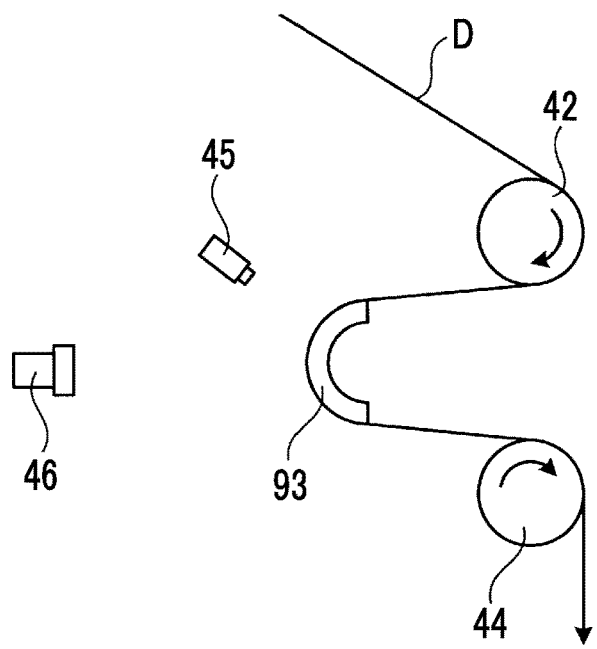
FIG. 15 is a schematic configuration view illustrating the modification example of the guide member.

As illustrated in FIG. 15, a corrugated board sheet defect detecting device of a second modification example of the fifth embodiment has the guide rollers 42 and 44, the radiating device 45, the image capturing device 46, and a curved body 93, which is a guiding device.

The traveling single-faced cardboard sheet D is guided by the guide roller 42, the curved body 93, and the guide roller 44. When the single-faced cardboard sheet D is guided by the curved body 93 while staying in contact with the semicolumnar body, the radiating device 45 radiates parallel light toward the medium B of the single-faced cardboard sheet D transported by the curved body 93, and the image capturing device 46 captures an image of a portion of the medium B irradiated with the parallel light.

In the second modification example, since the curved body 93 is set as the guide member, a single-faced cardboard sheet is guided by a curved surface of the curved body 93 and the vibration of the single-faced cardboard sheet D can be suppressed.

Figure 16:
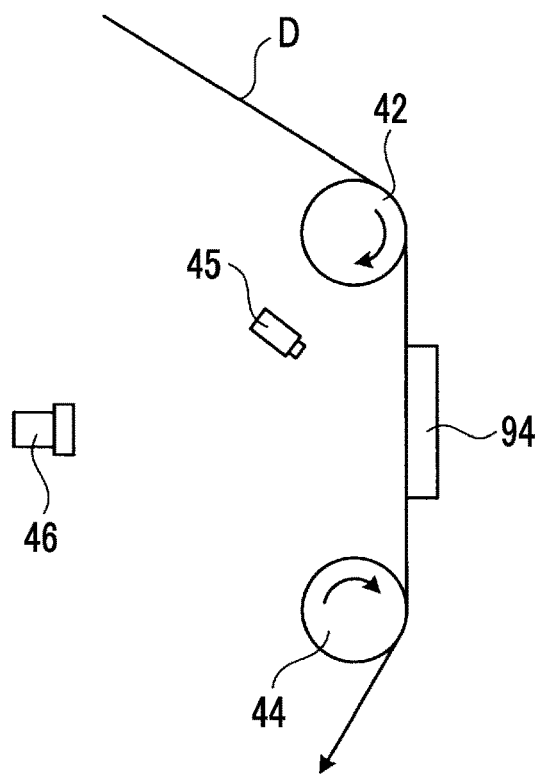
FIG. 16 is a schematic configuration view illustrating the modification example of the guide member.

As illustrated in FIG. 16, a corrugated board sheet defect detecting device of a third modification example of the fifth embodiment has the guide rollers 42 and 44, the radiating device 45, the image capturing device 46, and a plate-shaped body 94, which is a guiding device.

The traveling single-faced cardboard sheet D is guided by the guide roller 42, the plate-shaped body 94, and the guide roller 44. When the single-faced cardboard sheet D is guided by the plate-shaped body 94 while staying in contact with a flat portion of the plate-shaped body, the radiating device 45 radiates parallel light toward the medium B of the single-faced cardboard sheet D transported by the plate-shaped body 94, and the image capturing device 46 captures an image of a portion of the medium B irradiated with the parallel light.

In the third modification example, since the plate-shaped body 94 is set as the guide member, a single-faced cardboard sheet is guided by a flat surface of the plate-shaped body 94 and the vibration of the single-faced cardboard sheet D can be suppressed.

Figure 17:
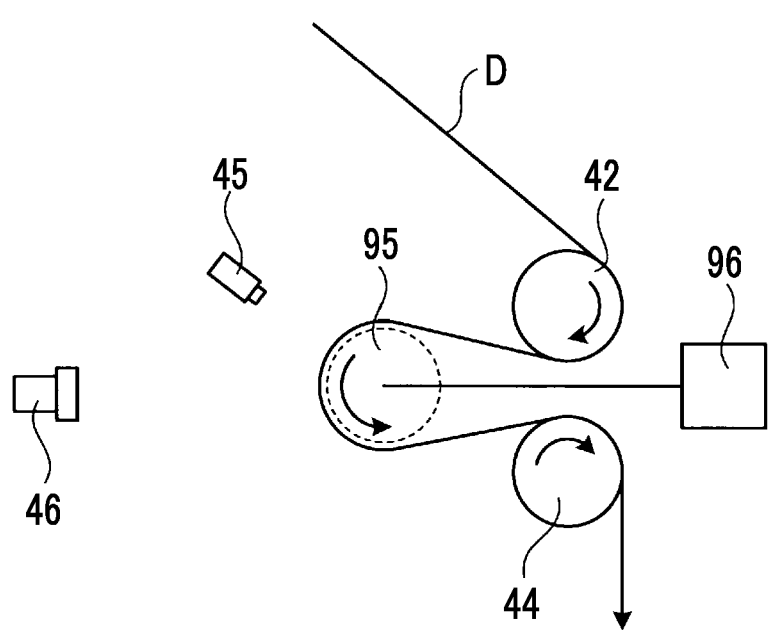
FIG. 17 is a schematic configuration view illustrating the modification example of the guide member.

As illustrated in FIG. 17, a corrugated board sheet defect detecting device of a fourth modification example of the fifth embodiment has the guide rollers 42 and 44, the radiating device 45, the image capturing device 46, and a guide roller 95 and a suction device 96, which are guiding devices. The guide roller 95 has a hollow shape, is provided with multiple suction holes in an outer circumferential surface thereof, and can suck the single-faced cardboard sheet by means of the suction device 96.

The traveling single-faced cardboard sheet D is guided by the guide roller 42, the guide roller 95, and the guide roller 44. When the single-faced cardboard sheet D is guided by the guide roller 95 while staying in contact with the circumferential surface of the guide roller, the suction device (suction unit) 96 enables the outer circumferential surface of the guide roller 95 to perform suction via each of the suction holes, the single-faced cardboard sheet D travels the outer circumferential surface of the guide roller 95 while being adsorbed onto the outer circumferential surface, the radiating device 45 radiates parallel light toward the medium B of the single-faced cardboard sheet D transported by the guide roller 95, and the image capturing device 46 captures an image of a portion of the medium B irradiated with the parallel light.

In the fourth modification example, since the guide roller 95 and the suction device 96 are set as the guide members, a single-faced cardboard sheet is guided while being adsorbed onto a guide surface of the guide roller 95, and the single-faced cardboard sheet D can be reliably brought into contact with the guide roller 95.

Although the guide roller 95, which is the guide member, is provided with the suction unit enabled by the suction device 96 in the fourth modification example, the columnar body (or cylindrical body) 91 of the fifth embodiment, the semicolumnar body (or semicylindrical body) 92, the curved body 93, and the plate-shaped body 94 of each modification example may be provided with the suction unit.

Sixth Embodiment

Figure 18:
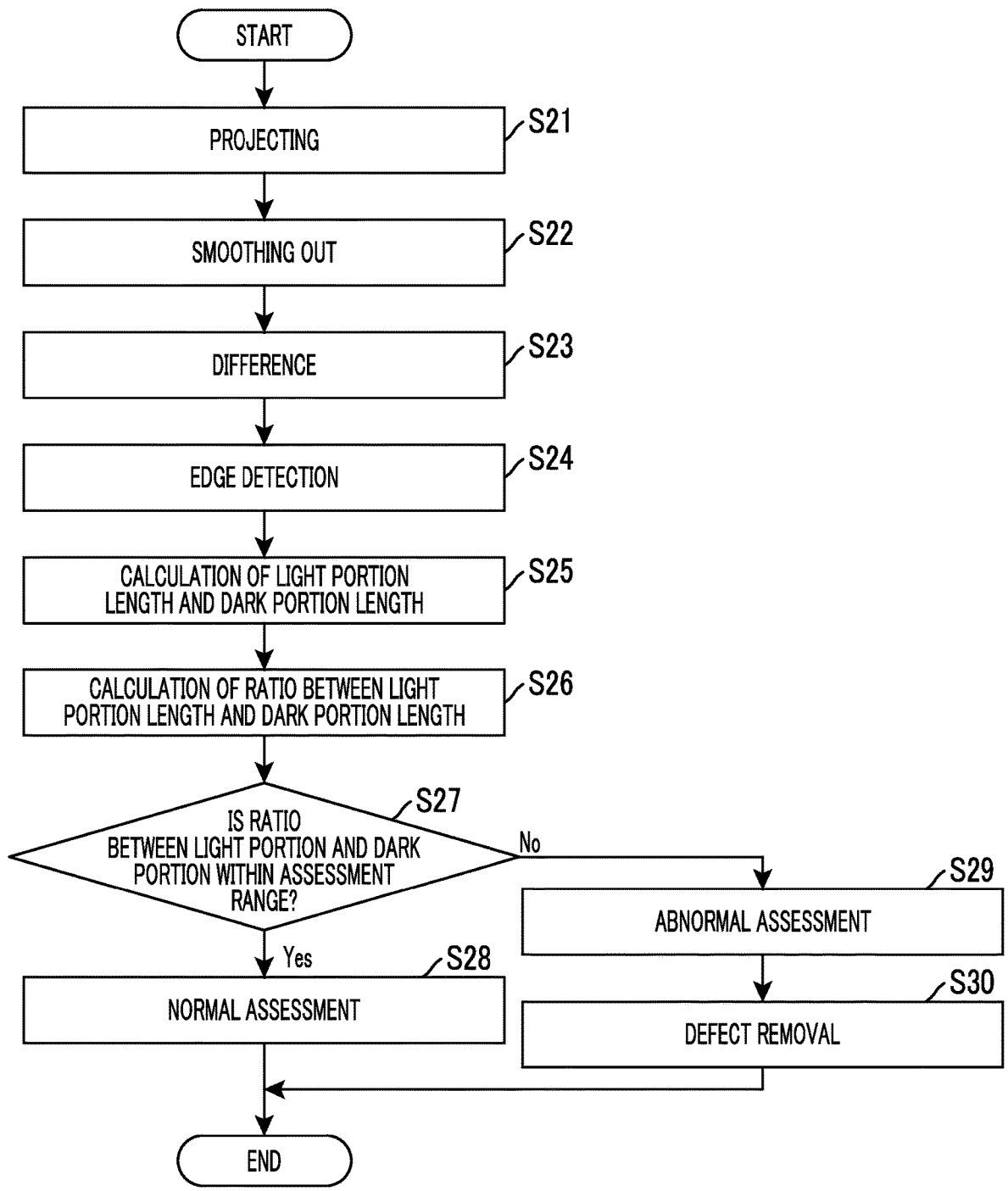
FIG. 18 is a flow chart for illustrating an image processing method of a corrugated board sheet defect detecting device of a sixth embodiment.

FIG. 18 is a flow chart for illustrating an image processing method of a corrugated board sheet defect detecting device of a sixth embodiment. The basic configuration of the corrugated board sheet defect detecting device of the embodiment is almost the same configuration as the first embodiment described above. Description will be made with reference to FIG. 2, members having the same configuration as in the embodiments described above will be assigned with the same reference signs, and description thereof will be omitted.

In the sixth embodiment, as illustrated in FIG. 2, the corrugated board sheet defect detecting device 40 has the guide rollers 41, 42, 43, and 44, the radiating device 45, the image capturing device 46, the control device 47, and the display device 48. The control device 47 has the shadow image processing device 51, the assessing device 52, and the memory device 53. In the embodiment, the assessing device 52 assesses the quality by comparing a ratio between the length of the light portion W and the length of the dark portion G with an assessment value. The assessing device 52 may be configured to assess the quality by comparing an average value of ratios between the lengths of the plurality of light portions W and the lengths of the plurality of dark portions G with an assessment value.

In this case, the assessment value is within a prescribed range but the assessment value is not limited thereto. For example, a ratio between a total value of the lengths of the plurality of light portions W, on which quality assessment is already completed, and a total value of the lengths of the plurality of dark portions G, on which quality assessment is already completed, may be set as the assessment value. Since the assessment value is used, ratios between the length of the light portion W and the length of the dark portion G are almost the same even when various types of devices vibrate. Even when a normal shadow image is not obtained, false detection is suppressed and a defect detection accuracy can be improved. In addition, a ratio between an average value of the lengths of the plurality of light portions W, on which quality assessment is already completed, and an average value of the lengths of the plurality of dark portions G, on which quality assessment is already completed, may be set as the assessment value. A defect detection accuracy can be further improved since the assessment value is used.

As shown in FIG. 18, in Step S21, a captured shadow image of the medium B is projected, and image capturing data pieces of the light portion W and the dark portion G are added up in the width direction of the single-faced cardboard sheet D, thereby calculating added luminance. In Step S22, noise is removed by smoothing out added luminance in the transporting direction. In Step S23, a difference in the added luminance between pixels adjacent to each other in the transporting direction is found, that is, a difference is acquired. In Step S24, since the value of a difference is large at an edge between the light portion W and the dark portion G, the peak value P at which the value of a difference is large is extracted. In Step S25, the length W1 of the light portion W and the length G1 of the dark portion G are calculated. In Step S26, a ratio between the length W1 of the light portion W and the length G1 of the dark portion G is calculated.

In Step S27, the ratio between the length W1 of the light portion W and the length G1 of the dark portion G is compared with an assessment range, and it is assessed that whether or not the ratio is within the assessment range. Specifically, the ratio is calculated as follows. If the ratio is equal to or lower than the assessment value, the single-faced cardboard sheet is assessed as non-defective, and if the ratio is higher than the assessment value, the sheet is assessed as defective.

Ratio=Length $W1$ of light portion $W$/Length $G1$ of dark portion $G$

That is, in Step S27, if it is assessed that the ratio is within the assessment range, the single-faced cardboard sheet is non-defective and processing transitions to Step S28. In this step, one flute of the medium B is assessed as non-defective. On the other hand, if it is assessed that the ratio is not within the assessment range in Step S27, the single-faced cardboard sheet is defective and processing transitions to Step S29. In Step S29, one flute of the medium B is assessed as defective, and in Step S30, the double-faced cardboard sheet F including the defective flute is output from the transport line to the outside.

As described above, in the corrugated board sheet defect detecting device of the sixth embodiment, the assessing device 52 assesses the quality by comparing a ratio between the length W1 of the light portion W and the length G1 of the dark portion G with the assessment value (assessment range). Accordingly, even when various types of devices vibrate or the single-faced cardboard sheet D slides during transporting and the length W1 of the light portion W and the length G1 of the dark portion G change, a ratio between the length W1 of the light portion W and the length G1 of the dark portion G is almost the same. Therefore, even when a normal shadow image is not obtained, false detection is suppressed and a defect detection accuracy can be improved.

Seventh Embodiment

Figure 19:
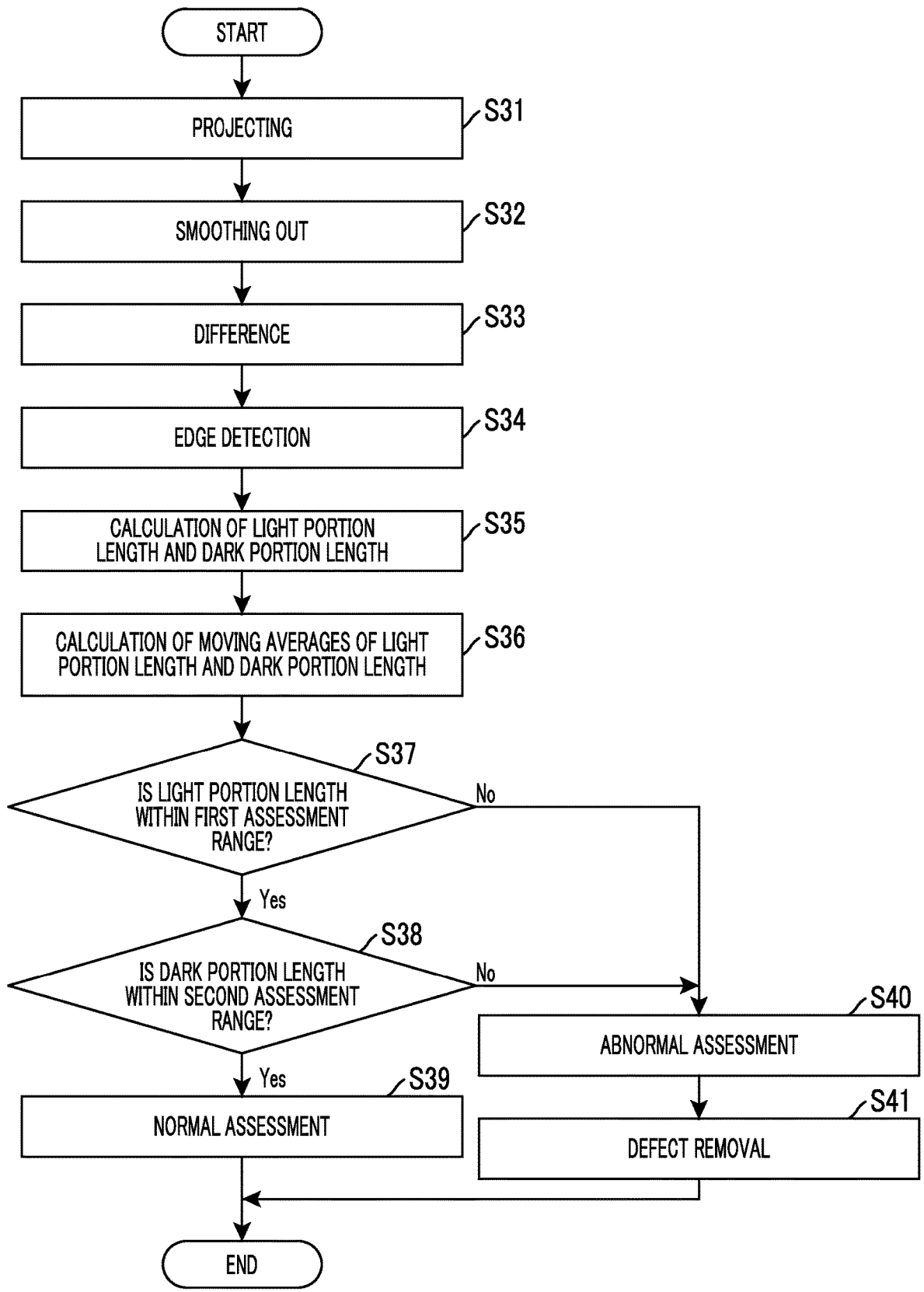
FIG. 19 is a flow chart for illustrating an image processing method of a corrugated board sheet defect detecting device of a seventh embodiment.

FIG. 19 is a flow chart for illustrating an image processing method of a corrugated board sheet defect detecting device of a seventh embodiment. The basic configuration of the corrugated board sheet defect detecting device of the embodiment is almost the same configuration as the first embodiment described above. Description will be made with reference to FIG. 2, members having the same configuration as in the embodiments described above will be assigned with the same reference signs, and description thereof will be omitted.

In the seventh embodiment, as illustrated in FIG. 2, the corrugated board sheet defect detecting device 40 has the guide rollers 41, 42, 43, and 44, the radiating device 45, the image capturing device 46, the control device 47, and the display device 48. The control device 47 has the shadow image processing device 51, the assessing device 52, and the memory device 53. In the embodiment, the assessing device 52 assesses the quality by comparing a light portion average value calculated by averaging out the lengths of a plurality of light portions with the first assessment value, and assesses the quality by comparing a dark portion average value calculated by averaging out an average of the lengths of a plurality of predetermined number of dark portions with the second assessment value.

As shown in FIG. 19, in Step S31, a captured shadow image of the medium B is projected, and image capturing data pieces of the light portion W and the dark portion G are added up in the width direction of the single-faced cardboard sheet D, thereby calculating added luminance. In Step S32, noise is removed by smoothing out added luminance in the transporting direction. In Step S33, a difference in the added luminance between pixels adjacent to each other in the transporting direction is found, that is, a difference is acquired. In Step S34, since the value of a difference is large at an edge between the light portion W and the dark portion G, the peak value P at which the value of a difference is large is extracted. In Step S35, the length W1 of the light portion W and the length G1 of the dark portion G are calculated. In Step S36, a light portion average value calculated by averaging out the lengths W1 of the plurality of light portions W and a dark portion average value calculated by averaging out the lengths G1 of the plurality of dark portions G are calculated.

In Step S37, it is assessed that whether or not the average value of the lengths W1 of the light portions W is within the first assessment range by comparing the average value of the lengths W1 of the light portions W with the first assessment range. For example, an average value is calculated as follows. If the average value is within the assessment range, the single-faced cardboard sheet is assessed as non-defective, and if the average value is out of the assessment range, the single-faced cardboard sheet is assessed as defective.

Light portion average value=(Length $W1$+length $W2$+length $W3$ of light portion $W$)/3

Dark portion average value=(Length $G1$+length $G2$+length $G3$ of dark portion $G$)/3

That is, if it is assessed that the average value of the lengths W1 of the light portions W is within the first assessment range in Step S37, the single-faced cardboard sheet is non-defective and processing transitions to Step S38. In Step S38, it is assessed that whether or not the average value of the lengths G1 of the dark portions G is within the second assessment range by comparing an average value of the lengths G1 of the dark portions G with the second assessment range. If it is assessed that the average value of the lengths G1 of the dark portions G is within the second assessment range, the single-faced cardboard sheet is non-defective and processing transitions to Step S39. In this step, one flute of the medium B is assessed as non-defective. On the other hand, if it is assessed that the average value of the lengths W1 of the light portions W is not within the first assessment range in Step S37, the single-faced cardboard sheet is defective and processing transitions to Step S40. If it is assessed that the average value of the lengths G1 of the dark portions G is not within the second assessment range in Step S38, the single-faced cardboard sheet is defective and processing transitions to Step S40. In Step S40, one flute of the medium B is assessed as defective, and in Step S41, the double-faced cardboard sheet F including the defective flute is output from the transport line to the outside.

As described above, in the corrugated board sheet defect detecting device of the seventh embodiment, the quality is assessed by comparing a light portion average value calculated by averaging out the lengths W1 of the plurality of light portions W with the first assessment value, and the quality is assessed by comparing a dark portion average value calculated by averaging out the lengths G1 of the plurality of dark portions G with the second assessment value. Accordingly, even in a case where the shapes of flutes of core paper have changed due to operating conditions, assessment is made by comparing an average value of lengths W1 of a predetermined number of the light portions W and an average value of the lengths G1 of a predetermined number of the dark portions G with the assessment value (assessment range). For this reason, comparison is made after an abnormal value is leveled, and this is not assessed as a defect. Thus, the occurrence of false detection of a defect is suppressed and a defect detection accuracy can be improved.

REFERENCE SIGNS LIST 10 corrugating machine (corrugated board sheet manufacturing device)
11 mill roll stand
12 preheater
13 mill roll stand
14 preheater
15 single facer
16 bridge
17 mill roll stand
18 preheater
19 glue machine
20 double facer
21 rotary shear
22 slitter scorer
23 cutoff
24 defective sheet outputting device
25 stacker
40 corrugated board sheet defect detecting device
41, 42, 43, 44 guide roller (guide member)
45 radiating device
46 image capturing device
47 control device
48 display device
51 shadow image processing device
52 assessing device
53 memory device
60 corrugated board sheet defect removing device
61 defect position identifying device
62 tracking device
81 radiation angle changing device
82 vibration detection device
83 alarm device
A bottom liner (first liner)
B medium (core paper)
C top liner (second liner)
D single-faced cardboard sheet
E, F double-faced cardboard sheet
W light portion
G dark portion

The invention claimed is:

1. A corrugated board sheet defect detecting device that detects a defect in a single-faced cardboard sheet guided by a guide member with corrugated core paper facing outwards, the device comprising:
a radiating device configured to radiate light toward the core paper at a radiation angle which is inclined through a predetermined angle set in advance relative to the single-faced cardboard sheet, and to form a shadow of a flute of the core paper;
an image capturing device configured to capture an image of a portion of the core paper, the portion being irradiated with the light;
an image processing device configured to define a light portion and a dark portion in a direction in which the single-faced cardboard sheet is transported based on a shadow image of the flute of the core paper captured by the image capturing device; and
an assessing device configured to:
compare a length of the light portion and a length of the dark portion in one flute of the core paper defined by the image processing device with assessment values set in advance; and
when the one flute of the core paper is determined to be defective, identify a position of the one defective flute on the core paper and assess the core paper including the one defective flute as defective,
wherein the radiating device radiates parallel light toward the core paper.

2. The corrugated board sheet defect detecting device according to claim 1,
wherein the guide member has a curved surface.

3. The corrugated board sheet defect detecting device according to claim 2, wherein the guide member is a guide roller.

4. The corrugated board sheet defect detecting device according to claim 2, wherein the guide member is a columnar body or a cylindrical body.

5. The corrugated board sheet defect detecting device according to claim 1,
wherein the guide member is a plate-shaped body.

6. The corrugated board sheet defect detecting device according to claim 1,
wherein the guide member is provided with a suction unit on a guiding surface thereof that guides the single-faced cardboard sheet.

7. The corrugated board sheet defect detecting device according to claim 1,
wherein the assessing device assesses the quality by comparing the length of the light portion with a first assessment value and assesses the quality by comparing the length of the dark portion with a second assessment value.

8. The corrugated board sheet defect detecting device according to claim 7,
wherein the first assessment value and the second assessment value are a value calculated by averaging out lengths of a plurality of the light portions, on which quality assessment is already completed, and a value calculated by averaging out lengths of a plurality of the dark portions, on which quality assessment is already completed, respectively.

9. The corrugated board sheet defect detecting device according to claim 7,
wherein the first assessment value and the second assessment value are set as a first assessment range and a second assessment range which are obtained by adding predetermined margins to prescribed reference values of the lengths of the light portion and the dark portion.

10. The corrugated board sheet defect detecting device according to claim 9,
wherein the first assessment value and the second assessment value are set for each type of the single-faced cardboard sheet, and are stored in a memory device.

11. The corrugated board sheet defect detecting device according to claim 1,
wherein the assessing device assesses the quality by comparing a ratio between the length of the light portion and the length of the dark portion with an assessment value.

12. The corrugated board sheet defect detecting device according to claim 11,
wherein the assessing device assesses the quality by comparing an average value of ratios between lengths of a plurality of the light portions and lengths of a plurality of the dark portions with the assessment value.

13. The corrugated board sheet defect detecting device according to claim 12,
wherein the assessment value is a ratio between a total value of the lengths of the plurality of the light portions, on which quality assessment is already completed, and a total value of the lengths of the plurality of the dark portions, on which quality assessment is already completed.

14. The corrugated board sheet defect detecting device according to claim 13,
wherein the assessment value is a ratio between an average value of the lengths of the plurality of the light portions, on which quality assessment is already completed, and an average value of the lengths of the plurality of the dark portions, on which quality assessment is already completed.

15. The corrugated board sheet defect detecting device according to claim 1,
wherein the assessing device assesses the quality by comparing a light portion average value, which is calculated by averaging out lengths of a plurality of the light portions, with a first assessment value and assesses the quality by comparing a dark portion average value, which is calculated by averaging out lengths of a plurality of the dark portions, with a second assessment value.

16. The corrugated board sheet defect detecting device according to claim 1,
wherein the radiation angle of the radiating device is an angle relative to a perpendicular line, which is perpendicular to the single-faced cardboard sheet and passes through a flute top portion of the core paper, and is set to an angle larger than an angle between the perpendicular line and an inclined line along an inclined surface of a flute of the core paper.

17. The corrugated board sheet defect detecting device according to claim 16,
wherein the image processing device defines the light portion and the dark portion by adding up image capturing data pieces in a predetermined pixel unit in a width direction of the single-faced cardboard sheet based on the images captured by the image capturing device.

18. The corrugated board sheet defect detecting device according to claim 1, further comprising:
a radiation angle changing device configured to change the radiation angle of the radiating device.

19. The corrugated board sheet defect detecting device according to claim 18,
wherein the image processing device defines the light portion and the dark portion by adding up image capturing data pieces in a predetermined pixel unit in a width direction of the single-faced cardboard sheet based on the images captured by the image capturing device.

20. The corrugated board sheet defect detecting device according to claim 1,
wherein the image processing device defines the light portion and the dark portion by adding up a part of image capturing data pieces in a width direction of the single-faced cardboard sheet on the basis of the images captured by the image capturing device.

* * * * *